US009983412B1

(12) United States Patent
Fuchs et al.

(10) Patent No.: US 9,983,412 B1
(45) Date of Patent: May 29, 2018

(54) WIDE FIELD OF VIEW AUGMENTED REALITY SEE THROUGH HEAD MOUNTABLE DISPLAY WITH DISTANCE ACCOMMODATION

(71) Applicant: The University of North Carolina at Chapel Hill, Chapel Hill, NC (US)

(72) Inventors: Henry Fuchs, Chapel Hill, NC (US); David Scott Dunn, Chapel Hill, NC (US); Cary Aaron Tippets, Durham, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 0 days. days.

(21) Appl. No.: 15/423,198

(22) Filed: Feb. 2, 2017

(51) Int. Cl.
G02B 27/14 (2006.01)
G02B 27/01 (2006.01)
G02B 26/08 (2006.01)

(52) U.S. Cl.
CPC ..... *G02B 27/0179* (2013.01); *G02B 26/0825* (2013.01); *G02B 27/0172* (2013.01); *G02B 2027/0185* (2013.01)

(58) Field of Classification Search
CPC .. G02B 26/0825; G02B 6/3536; G02B 7/188; G02B 5/30; G02B 2006/12142;
(Continued)

(56) References Cited

U.S. PATENT DOCUMENTS 5,537,144 A * 7/1996 Faris .................. G02B 27/0093
348/54
6,483,484 B1 11/2002 Yamazaki et al.
(Continued)

FOREIGN PATENT DOCUMENTS

JP 2011-145607 A 7/2011
KR 10-2008-0103407 A 11/2008
(Continued)

OTHER PUBLICATIONS

Lee et al., "Effects of Optical Combiner and IPD Change for Convergence on Near-Field Depth Perception in an Optical See-Through HMD," IEEE Transactions on Visualization and Computer Graphics, vol. 22, No. 5, pp. 1540-1554 (May 2016).
Johnson et al., "Assessing visual discomfort using dynamic lens and monovision displays," 3D Image Acquisition and Display: Technology, Perception, and Applications, Optical Society of America, TT4A.1, pp. 1-3 (2016).
Kramida et al., "Resolving the vergence-accomodation conflict in head mounted displays," Department of Computer Science, University of Maryland, pp. 1-17 (2016).
(Continued)

*Primary Examiner* — Mustak Choudhury
(74) *Attorney, Agent, or Firm* — Jenkins, Wilson, Taylor & Hunt, P.A.

(57) ABSTRACT

A head mountable augmented reality see through near eye display system includes a see through augmented reality image focal distance modulator for changing a distance at which augmented reality images appear in focus and including at least one light transmissive surface through which real world objects are viewable. The system further includes a display for generating an augmented reality image and projecting the augmented reality image onto the see through augmented reality image focal distance modulator. The system further includes an augmented reality image focal distance controller for controlling the see through augmented reality image focal distance modulator to cause the augmented reality image to appear in focus a distance corresponding to a vergence distance and for changing the distance at which the augmented reality image appears to be in focus in correspondence with changes in the vergence distance.

16 Claims, 13 Drawing Sheets

(58) Field of Classification Search
CPC .... G02B 27/0068; G02B 27/017; G02B 3/14; G02B 6/3538; G02B 6/00; G02B 27/0172; G06T 7/73; G06T 15/506; H04N 13/0456
USPC .............. 359/13, 244.1, 358, 630, 631, 632; 348/E13.032, 46, E13.041, E13.074; 345/633

See application file for complete search history.

(56) References Cited

U.S. PATENT DOCUMENTS

| | | | |
|---|---|---|---|
| 6,977,705 B1 | 12/2005 | Chaing et al. | |
| 7,639,208 B1 | 12/2009 | Ha et al. | |
| 9,858,721 B2 | 1/2018 | Maimone et al. | |
| 2003/0179464 A1 | 9/2003 | Amanai | |
| 2004/0108971 A1 | 6/2004 | Waldern et al. | |
| 2004/0265150 A1* | 12/2004 | McElfresh | B81B 3/0035 417/413.1 |
| 2005/0117016 A1 | 6/2005 | Surman | |
| 2007/0285346 A1 | 12/2007 | Li | |
| 2008/0088937 A1 | 4/2008 | Tang | |
| 2008/0117289 A1* | 5/2008 | Schowengerdt | G02B 26/005 348/46 |
| 2010/0118123 A1 | 5/2010 | Freedman et al. | |
| 2012/0068913 A1 | 3/2012 | Bar-Zeev et al. | |
| 2012/0119978 A1 | 5/2012 | Border et al. | |
| 2012/0120498 A1* | 5/2012 | Harrison | G02B 3/08 359/630 |
| 2012/0206452 A1 | 8/2012 | Geisner et al. | |
| 2012/0235887 A1 | 9/2012 | Border et al. | |
| 2013/0083173 A1 | 4/2013 | Geisner et al. | |
| 2013/0162505 A1 | 6/2013 | Crocco et al. | |
| 2013/0222369 A1 | 8/2013 | Huston et al. | |
| 2013/0286053 A1 | 10/2013 | Fleck et al. | |
| 2014/0168783 A1 | 6/2014 | Luebke et al. | |
| 2015/0243094 A1* | 8/2015 | Schowengerdt | G06T 7/73 345/633 |
| 2015/0243099 A1 | 8/2015 | Schowengerdt | |
| 2015/0248046 A1 | 9/2015 | Schowengerdt | |
| 2015/0363978 A1 | 12/2015 | Maimone et al. | |
| 2016/0320620 A1 | 11/2016 | Maimone | |

FOREIGN PATENT DOCUMENTS

| | | |
|---|---|---|
| KR | 10-2009-0052169 A | 5/2009 |
| WO | WO 2014/011266 A2 | 1/2014 |
| WO | WO 2014/113455 A1 | 7/2014 |
| WO | WO 2015/095737 A2 | 6/2015 |

OTHER PUBLICATIONS

"Microsoft HoloLens—Official Site," Bring ideas to life, Microsoft, http://www.microsoft.com/microsoft-hololens/en-us, pp. 1-11 (Accessed Oct. 3, 2016).
"Augmented Reality—Home," Meta Company, https://www.metavision.com, pp. 1-8 (Accessed Sep. 25, 2016).
"Varioptic—Home—Liquid Lens Solutions, Auto Focus M12 and C-mount lens modules," Varioptic—a Business Unit of Parrot, http://www.varioptic.com/, pp. 1-3 (Accessed Sep. 25, 2016).
"Focus Tunable Lenses—Overview," Optotune, http://www.optotune.com/products/focus-tunable-lenses, Accessed Oct. 3, 2016, pp. 1-2 (2016).
Konrad et al., "Novel optical configurations for virtual reality: Evaluating user preference and performance with focus-tunable and monovision near-eye displays," Proceedings of the ACM Conference on Human Factors in Computing Systems (CHI16), pp. 1-10 (2016).
Commonly-assigned, co-pending U.S. Appl. No. 62/348,838 for "Methods, Systems, and Computer Readable Media for Utilizing Occlusion Masks for Near-Eye Augmented Reality (AR) Displays," (Unpublished, filed Jun. 10, 2016).
Yamaguchi et al., "See-through integral imaging display with background occlusion capability," Applied Optics Research Article, vol. 55, No. 3, pp. A144-A149 (Jan. 20, 2016).
Seghir et al., "Extended PDMS stiffness range for flexible systems," Sensors and Actuators A: Physical, 230, pp. 33-39 (2015).
Aksit et al., "Slim near-eye display using pinhole aperture arrays," Applied optics, vol. 54, No. 11, pp. 3422-3427 (2015).
Benko et al., "FoveAR: Combining an optically see-through near-eye display with Spatial Augmented Reality Projections," Proceedings of the 28th Annual ACM Symposium on User Interface Software & Technology, pp. 129-135 (2015).
Kim et al., "Three-dimensial holographic head mounted display using holographic optical element," Consumer Electronics (ICCE), 2015 IEEE International Conference, pp. 132-133 (2015).
Huang et al., "The light field stereoscope: Immersive Computer Graphics via Factored Near-Eye Light Field Displays with Focus Cues," ACM SIGGRAPH Emerging Technologies, pp. 1-12 (2015).
Johnson et al., "Dynamic lens and monovision 3D displays to improve viewer comfort" arXiv preprint arXiv:1512.09163, UC Berkeley—UCSF Graduate Program in Bioengineering, pp. 1-19 (2015).
Notification of Transmittal of the International Search Report and the Written Opinion of the International Searching Authority, or the Declaration for PCT International Patent Application No. PCT/US2014/071556 (dated Jun. 25, 2015).
"User Interface," Glass Developers—Google Developers, Google Glass, Creative Commons Attribution 3.0 License, https://web.archive.org/web/20140219090943/https://developers.google.com/glass/design/ui/, pp. 1-3 (Feb. 18, 2014).
Steptoe, "AR-Rift (Part 1)," http://willsteptoe.com/post/66968953089/ar-rift-part-1, pp. 1-4 (2014).
Maimone et al., "Pinlight displays: wide field of view augmented reality eyeglasses using defocused point light sources," ACM SIGGRAPH 2014 Emerging Technologies Booth 203, ACM, pp. 1-2 (2014).
Hua et al., "A 3d integral imaging optical see-through head-mounted display," Optics express, vol. 22, No. 11, pp. 13484-13491 (May 28, 2014).
Hu et al., "High-resolution optical see-through multi-focal-place head-mounted display using using freeform op-tics," Optics express, vol. 22, No. 11, pp. 13896-13903 (May 30, 2014).
Maimone et al., "Pinlight displays: wide field of view augmented reality eyeglasses using defocused point light sources," ACM Trans. Graph. 33, 4, Article 89, pp. 89:1-89:11 (Jul. 2014).
Notification of Transmittal of the International Search Report and the Written Opinion of the International Searching Authority, or the Declaration for International Application No. PCT/US2014/011651 (dated May 13, 2014).
Trew, "A look at Optinvent's updated Ora smartglasses (hands-on)," Engadget, https://www.engadget.com/2014/03/18/optinvent-updated-ora-hands-on/, pp. 1-2, (Mar. 18, 2014).
Lanman et al., "Near-eye light field displays" NVIDIA Research, pp. 1-10 (2013).
Kress et al., "A review of head-mounted displays (HMD) technologies and applications for consumer electronics," In Proc. SPIE, vol. 8720, pp. 87200A-1-87200A-13 (2013).
Gao et al., "Optical See-Through Head-Mounted Display with Occlusion Capability." SPIE Defense, Security and Sensing. International Society for Optics and Photonics, pp. 87350F-1-87350E-9 (2013).
Maimone et al., "Computational augmented reality eyeglasses," Mixed and Augmented Reality (ISMAR), 2013 IEEE International Symposium, pp. 1-10 (2013).
"Smart Glasses: A New Way of Seeing the World," Epson—Exceed Your Vision, Epson Moverio BT-300 and BT200 Smart Glasses—Epson America, Inc. http://www.epson.com/cgi-bin/Store/jsp/Landing/moverio-augmented-reality-smart-glasses.do, pp. 1-3 (Nov. 27, 2013).
"A New Architecture," Innovega—the Future of Personal Media, Innovega Inc.—Product—A New Architecture, https://web.archive.org/web/20131129020042/http://innovega-inc.com/new-architecture.php, pp. 1-2 (Nov. 29, 2013).

(56) References Cited

OTHER PUBLICATIONS

"Taking your vision to the ultimate level," Seeing through, Seeing beyond, A vision ahead, Lumus, https://web.archive.org/web/20131103193358/http://www.lumus-optical.com/, pp. 1-2 (Nov. 3, 2013).
Maimone et al., "General-Purpose Telepresence with Head-Worn Optical See-Through Displays and Projector-Based Lighting," To appear in: IEEE Virtual Reality, pp. 23-26 (Mar. 2013).
Wetzstein et al., "Tensor Displays: Compressive Light Field Synthesis using Multilayer Displays with Directional Backlighting," ACM Transactions on Graphics (Proceedings of SIGGRAPH), vol. 31, Issue 4, pp. 1-11 (2012).
Swirski et al., "Robust real-time pupil tracking in highly off-axis images," Proceedings of ETR, pp. 1-4 (2012).
Travis et al., "Wedge Optics in Flat Panel Displays," Proceedings of the IEEE, vol. 101, No. 1, pp. 45-60, (copyright 2012, published Jan. 2013).
Hu et al., "Design of an Optical See-Through Multi-Focal-Plane Stereoscopic 3D Display Using Freeform Prisms," Frontiers in Optics Conference, Paper FTh1F.2, Optical Society of America, pp. 1-2 (2012).
Tag Optics Inc., Home-Revolutionizing Adaptive Optics Through Acoustics, http://www.tag-optics.com/, p. 1 (copyright 2012).
Gao et al., "Occlusion Capable Optical See-Through Head-Mounted Display Using Freeform Optics," IEEE International Symposium on Mixed and Augmented Reality (ISMAR) 2012, pp. 281-282 (Nov. 2012).
Guenter et al., "Foveated 3D Graphics," ACM Trans. Graph. 31 6, Article 164 (TOG), pp. 164:1-164:10 (Nov. 2012).
Maimone et al., "Real-Time Volumetric 3D Capture of Room-Sized Scenes for Telepresence," 3DTV Conference: The True Vision—Capture, Transmission and Display of 3D Video (3DTV-CON), pp. 1-4 (Oct. 2012).
Carmigniani et al., "Augmented reality technologies, systems and applications," Multimedia Tools and Applications, 51(1), pp. 341-377 (2011).
Yamazaki et al., "Simultaneous self-calibration of a projector and a camera using structured light," In Proc. Projector Camera Systems, pp. 1-8 (2011).
Berger et al., "Markerless Motion Capture using multiple Color-Depth Sensors," In proceedings of Vision, Modeling, and Visualization, pp. 1-8 (2011).
Wetzstein et al., "Layered 3D: Tomographic Image Synthesis for Attenuation-Based Light Field and High Dynamic Range Displays," ACM Transactions on Graphics, vol. 30, No. 4, pp. 95:1-95:11 (2011).
Pamplona et al., "Catra: Interactive measuring and modeling of cataracts," ACM SIGGRAPH 2011 Papers, ACM, New York, NY, USA, SIGGRAPH 2011 papers, Article 47, pp. 1-9 (2011).
Jurik et al., "Prototyping a light field display involving direct observation of a video projector array," IEEE International Workshop on Projector-Camera Systems (PROCAMS), pp. 15-20 (2011).
Lingley et al., "A Single-Pixel Wireless Contact Lens Display," Journal of Micromechanics and Micro-engineering, vol. 21, Issue 12, pp. 1-8, (2011).
Lanman et al., "Polarization Fields: Dynamic Light Field Display Using Multi-Layer LCDs," ACM Transactions on Graphics, vol. 30, Issue 6, pp. 1-10 (2011).
Shibata et al., "The zone of comfort: Predicting visual discomfort with stereo displays," J. Vision 11(8) pp. 1-53 (2011).
Maimone et al., "A First Look at a Telepresence System with Room-Sized Real-Time 3D Capture and Life-Sized Tracked Display Wall," Artificial Reality and Telexistence (ICAT), 21st International Conference, pp. 1-6 (Nov. 2011).
Commonly-assigned, co-pending U.S. Appl. No. 61/552,775 for "Methods, Systems, and Computer Readable Media for Reducing Interference Between A Plurality of Structured Light Depth Sensors," (Unpublished, filed Oct. 28, 2011).
Maimone et al., "Encumbrance-Free Telepresence System with Real-Time 3D Capture and Display using Commodity Depth Cameras," 10th IEEE International Symposium on Mixed and Augmented Reality (ISMAR), pp. 137-146 (Oct. 2011).
Fite-Georgel, "Is There a Reality in Industrial Augmented Reality?" 10th IEEE International Symposium on Mixed and Augmented Reality (ISMAR), Science and Technology Proceedings, Switzerland, pp. 201-210 (Oct. 2011).
Cheng et al., "Design of a Wide-Angle, Lightweight Head-Mounted Display Using Free-Form optics Tiling," Optics Letters, vol. 36, No. 11: pp. 2098-2100 (Jun. 2011).
Benoit-Pasanau et al., "Minimization of diffraction peaks of spatial light modulators using Voronoi diagrams," Optics Express, vol. 18, No. 14, pp. 15223-15235 (Jul. 1, 2010).
Kruijff et al., "Perceptual issues in augmented reality revisited," IEEE International Symposium on Mixed and Augmented Reality, pp. 3-12 (2010).
Hiura et al., "Krill-eye: Superposition compound eye for wide-angle imaging via grin lenses," IPSJ Transactions on Computer Vision and Application pp. 144-157 (2010).
Pamplona et al., "NETRA: Interactive Display for Estimating Refractive Errors and Focal Range," ACM SIGGRAPH 2010 Papers, ACM, New York, NY, USA, SIGGRAPH '10, pp. 1-9 (2010).
Lanman et al., "Content-Adaptive Parallax Barriers: Optimizing Dual-Layer 3D Displays using Low-Rank Light Field Factorization," ACM Transactions on Graphics, vol. 29, Issue 6, pp. 1-10 (2010).
McGuire, Jr. et al., "Next-Generation Head-Mounted Display," Proceedings of SPIE 7618, Emerging Liquid Crystal Technologies V, pp. 761804-1-761804-8 (2010).
Cakmakci et al., "Design of a Freeform Single-Element Head-Worn Display," Proceedings of the SPIE 7618, Emerging Liquid Crystal Technologies V, pp. 761803-1-761803-6 (2010).
Ye et al., "A Practical Multi-Viewer Tabletop Autostereoscopic Display," 9th IEEE International Symposium on Mixed and Augmented Reality (ISMAR), pp. 147-156 (Oct. 2010).
Kroeker et al., "Mainstreaming Augmented Reality," Communications of the ACM, vol. 53, Issue 7, pp. 19-21, (Jul. 2010).
Liu et al., "A Novel Prototype for an Optical See-Through Head-Mounted Display with Addressable Focus Cues," IEEE Transactions on Visualization and Computer Graphics, vol. 16, No. 3, pp. 381-393 (May-Jun. 2010).
Joshi et al., "Image Deblurring using Inertial Measurement Sensors," In ACM SIGGRAPH 2010 papers, pp. 1-8 (2010).
Mohan et al., "Bokode: Imperceptible visual tags for camera based interaction from a distance," ACM SIGGRAPH 2009 Papers, ACM, New York, NY, USA, SIGGRAPH '09, pp. 98:1-98:8 (2009).
Lincoln et al., "Animatronic Shader Lamps Avatars," Proceedings of the 2009 8th IEEE International Symposium on Mixed and Augmented Reality, ISMAR, Washington, DC, USA. IEEE Computer Society, pp. 1-10 (2009).
Lincoln et al., "Multi-View Lenticular Display for Group Teleconferencing," Proceedings of the 2nd International Conference on Immersive Telecommunications, IMMERSCOM, ICST, Brussels, Belgium, Belgium ICST (Institute for Computer Sciences, Social-Informatics and Telecommunications Engineering), pp. 1-8 (2009).
Nashel et al., "Random Hole Display: A Non-Uniform Barrier Autostereoscopic Display," 3DTV Conference: The True Vision—Capture, Transmission and Display of 3D Video, pp. 1-4 (May 2009).
Liu et al., "An optical see-through head mounted display with addressable focal planes," Mixed and Augmented Reality, ISMAR 2008, 7th IEEE/ACM International Symposium, pp. 33-42 (2008).
Werber et al., "Tunable pneumatic microoptics," Journal of Microelectromechanical Systems, vol. 17, No. 5, pp. 1218-1227 (Oct. 2008).
Hoffman et al., "Vergence-accommodation conflicts hinder visual performance and cause visual fatigue," J. Vision 8(3), pp. 1-48 (2008).
Santos et al., "The Daylight Blocking Optical Stereo See-Through HMD," Proceedings of the 2008 Workshop on Immersive Projection Technologies/Emerging Display Technologies, IPT/EDT, ACM, Article 4, New York, USA, pp. 1-4 (2008).

(56) References Cited

OTHER PUBLICATIONS

Kiyokawa, "A wide field-of-view head mounted projective display using hyperbolic half-silvered mirrors," Proceedings of the 2007 6th IEEE and ACM International Symposium on Mixed and Augmented Reality, IEEE Computer Society, pp. 1-4 (2007).
Son et al., "Three-dimensional imaging system based on a light-emitting diode array," Optical Engineering, vol. 46(10), pp. 103205(1)-103205(4) (Oct. 2007).
Hong et al., "Optical occlusion in a see-through AR system," International Symposium on Photoelectronic Detection and Imaging: Technology and Applications 2007. International Society for Optics and Photonics, pp. 662309-1-662306-7 (2007).
Zhou et al., "A Novel Optical See-Through Head-Mounted Display with Occlusion and Intensity Matching Support." Technologies for E-Learning and Digital Entertainment. Springer Berlin Heidelberg, pp. 56-62 (2007).
Hagood et al., "A Direct-View Mems Display for Mobile Applications," SID Symposium Digest of Technical Papers, vol. 38, Issue 1, pp. 1-4 (2007).
Nagahara et al., "Super wide field of view head mounted display using catadioptrical optics," Presence, vol. 15, No. 5, pp. 588-598 (2006).
Levola, "Diffractive optics for virtual displays," In Journal of the Society for Information Display 14(5), pp. 467-475 (2006).
Feng et al., "Realization of Multilayer Occlusion between Real and Virtual Scenes in Augmented Reality," in Proceedings of the 10th International Conference on Computer Supported Cooperative Work in Design, pp. 1-5 (May 2006).
Wang et al., "Depth-of-focus of the human eye: Theory and clinical implications," Survey of Ophthalmology, vol. 51, No. 1, pp. 75-85 (Feb. 2006).
Bharadwaj et al., "Acceleration characteristics of human ocular accommodation," Vision Research, 45, pp. 17-28 (2005).
Sisodia et al., "Design of an advanced helmet mounted display (ahmd)," Defense and Security, International Society for Optics and Photonics, pp. 304-315 (2005).
Brown et al., "Camera-based calibration techniques for seamless multiprojector displays," IEEE Transactions on Visualization and Computer Graphics 11(2), pp. 1-16 (2005).
Cakmakci et al., "Design of a compact optical see-through head-worn display with mutual occlusion capability," International Society for Optics and Photonics, pp. 58750H-1-58750H-6 (2005).
Wang et al., "Depth-of-focus of the human eye in the near retinal periphery," Vision Research 44, pp. 1115-1125 (2004).
Cakmakci et al., "A Compact Optical See-Through Head-Worn Display with Occlusion Support," Proceedings of the 3rd IEEE and ACM International Symposium on Mixed and Augmented Reality, ISMAR, Washington, DC, USA, IEEE Computer Society, pp. 1-10 (2004).
Dodgson, "Variation and extrema of human interpupillary distance," Electronic imaging 2004, International Society for Optics and Photonics, Proceedings of SPIE, pp. 1-11 (2004).
Kasthurirangan et al., "Amplitude dependent accommodative dynamics in humans," Vision Research, 43(27), pp. 2945-2956 (2003).
Kiyokawa et al., "An Occlusion-Capable Optical See-Through Head Mount Display for Supporting Co-located Collaboration," Proceedings of the 2nd IEEE/ACM International Symposium on Mixed and Augmented Reality, ISMAR, Washington, DC, USA. IEEE Computer Society, pp. 1-9 (2003).
Mansell et al., "Deformable mirror development at Stanford University," International Symposium on Optical Science and Technology, Proceedings of SPIE vol. 4493, pp. 1-12 (2002).
Heron et al., "Dynamics of the accommodation response to abrupt changes in target vergence as a function of age," Vision Research, 41(4), pp. 507-519 (2001).
Kasai et al., "A Practical See-Through Head Mounted Display Using a Holographic Optical Element," Optical Review, vol. 8, No. 4, pp. 241-244 (2001).
McKay et al., "Membrane-mirror based autostereoscopic display for tele-operation and teleprescence applications," Electronic Imaging, International Society for Optics and Photonics, pp. 198-207 (2000).
Arthur, "Effects of field of view on performance with head-mounted displays," PhD thesis, University of North Carolina at Chapel Hill, 149 pages (2000).
McKay et al., "Membrane Mirror Based Display for Viewing 2D and 3D Images," Electronic Imaging'99, International Society for Optics and Photonics, pp. 144-155 (1999).
Fuchs et al., "Augmented reality visualization for laparoscopic surgery," Proceedings of the First International Conference on Medical Image Computing and Computer-Assisted Intervention, Springer-Verlag, pp. 1-10 (1998).
Raskar et al., "The Office of the Future: A Unified Approach to Image-Based Modeling and Spatially Immersive Displays," Proceedings of the 25th Annual Conference on Computer Graphics and Interactive Techniques, SIGGRAPH, pp. 1-10 (1998).
Feiner et al., "A Touring Machine: Prototyping 3D Mobile Augmented Reality Systems for Exploring the Urban Environment," Proceedings of the 1st IEEE International Symposium on Wearable Computers, ISWC, Washington, DC, USA, IEEE Computer Society, pp. 208-217 (1997).
Daly, "The Visible Differences Predictor: an Algorithm for the Assessment of Image Fidelity," SPIE vol. 1666 Human Vision, Visual Processing, and Digital Display, pp. 2-15 (1993).
Neumann et al., "A Vision of Telepresence for Medical Consultations and Other Applications," Proceedings of the Sixth International Symposium on Robotics Research, pp. 1-7 (Oct. 1993).
Feiner et al., "Knowledge-Based Augmented Reality," Communications of the ACM, vol. 36, No. 7, pp. 53-62 (Jul. 1993).
Caudell et al., "Augmented Reality: an Application of Heads-up Display Technology to Manual Manufacturing Processes," Proceedings of the Twenty-Fifth Hawaii International Conference on System Sciences, vol. II, pp. 659-669 (Jan. 1992).
Kotulak et al., "The accommodative response to subthreshold blur and to perceptual fading during the Troxler phenomenon," Perception, vol. 15(1), pp. 7-15 (1986).
Ronchi et al., "Depth of focus in peripheral vision," Ophthalmic Res, 7(3), pp. 152-157 (1975).
Richardson, "Bayesian-Based Iterative Method of Image Restoration," Journal of the Optical Society of America, vol. 62, No. 1, pp. 55-59 (Jan. 1972).
Phillips et al., "Analysis of accommodative response times using histogram information," American Journal of Optometry & Archives of American Academy of Optometry, 49(5), pp. 389-401 (1972).
Rawson, "Vibrating varifocal mirrors for 3-D imaging," IEEE Spectrum, 6(9), pp. 37-43 (1969).
Spencer et al., "General ray-tracing procedure," JOSA, 52(6), pp. 672-678 (1962).
Campbell et al., "Dynamics of Accommodation responses of the Human Eye," J. Physiol., 151, pp. 285-295 (1960).
Campbell, "The depth of field of the human eye," Optica Acta: International Journal of Optics, 4(4), pp. 157-164 (1957).
Lippmann, "Epreuves reversible donnant la sensatation du relief,"Comptes-Rendus Academie des Sciences, 146, (translation included), pp. 821-825 (1908).
Lippmann, "Photographie—Epreuves reversible. Photographies integrals," Acdemie des sciences, 146, translation included, pp. 446-451 (1908).
Notice of Allowance and Fee(s) Due for U.S. Appl. No. 14/761,229 (dated May 19, 2017).
Non-Final Office Action for U.S. Appl. No. 14/761,229 (dated Jan. 27, 2017).
Notice of Allowance and Fee(s) Due for U.S. Appl. No. 14/761,229 (dated Aug. 30, 2017).

\* cited by examiner

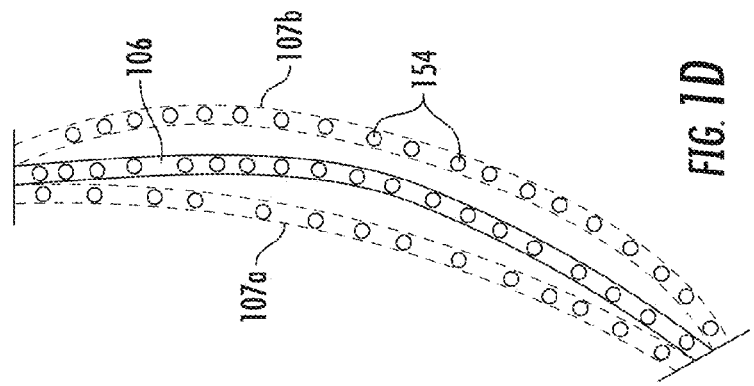
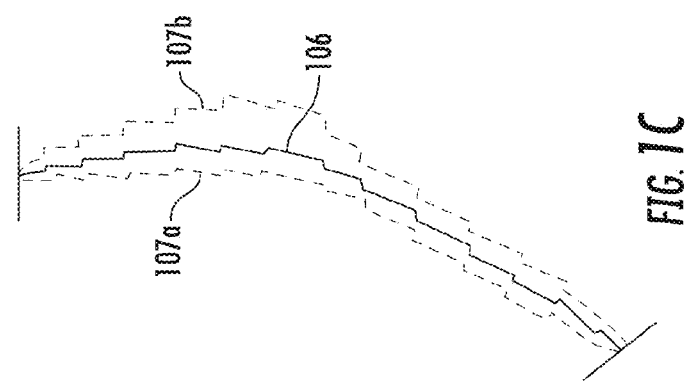
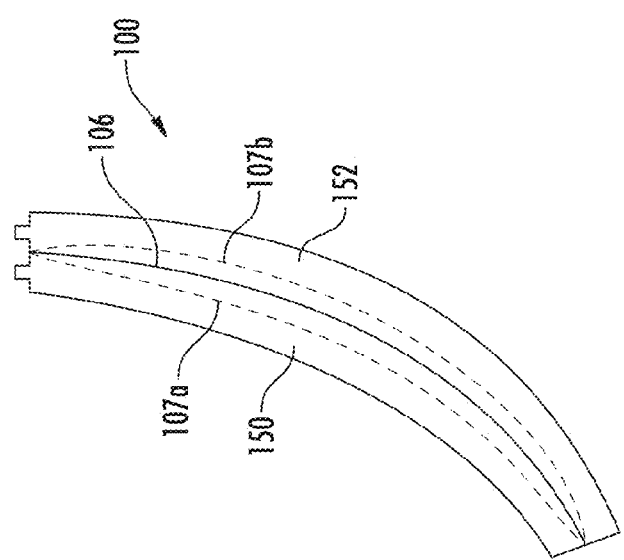

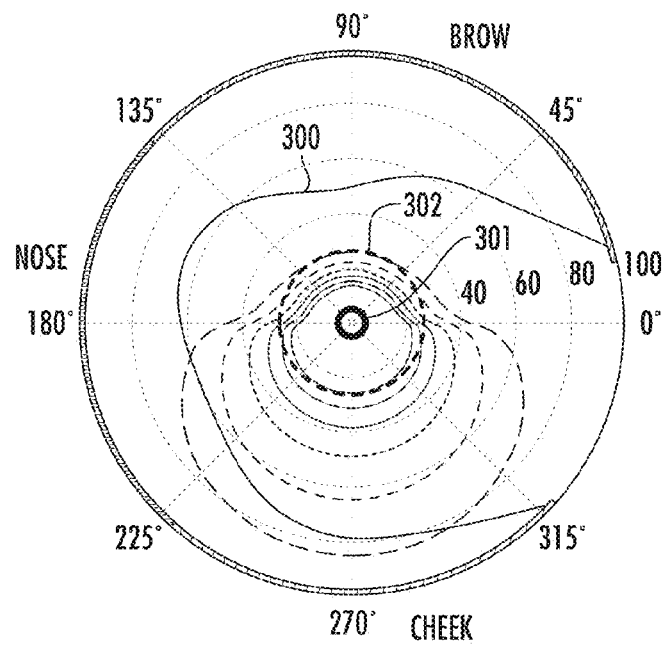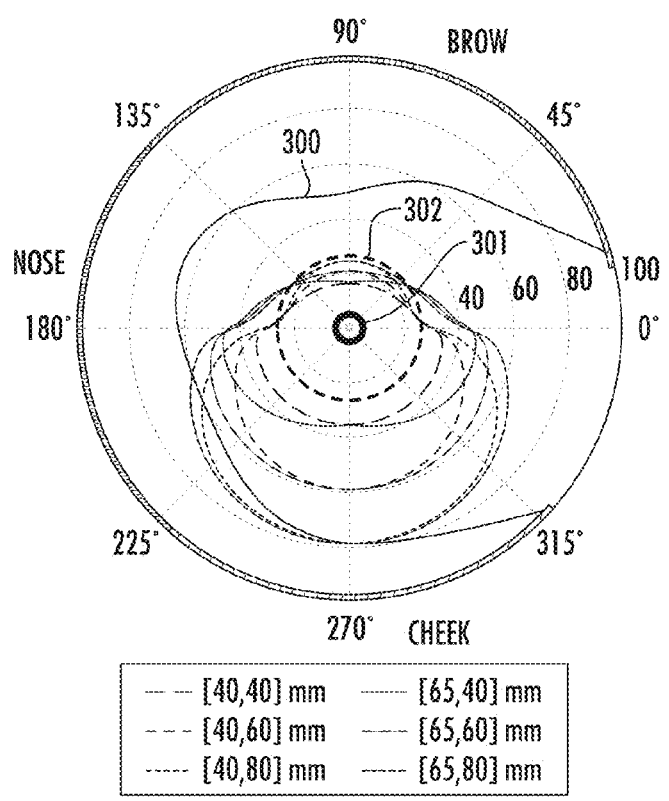
FIG. 3

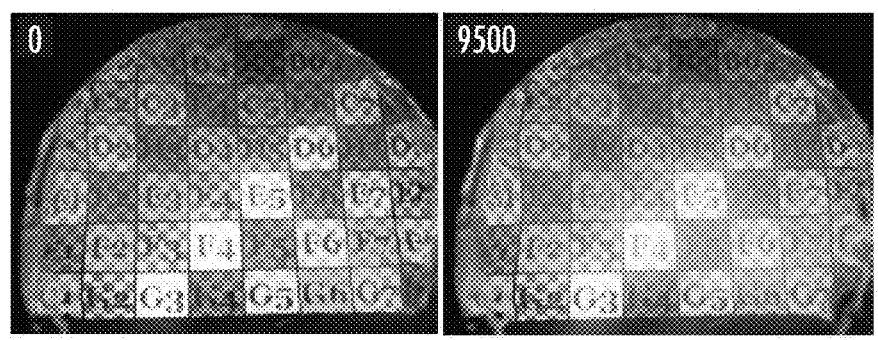
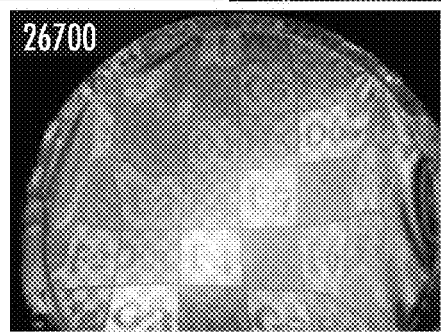
FIG. 10

WIDE FIELD OF VIEW AUGMENTED REALITY SEE THROUGH HEAD MOUNTABLE DISPLAY WITH DISTANCE ACCOMMODATION

GOVERNMENT INTEREST

This invention was made with government support under Grant No. 1645463 awarded by the National Science Foundation under the Early Concept Grants for Exploratory Research (EAGER) program. The government has certain rights in the invention.

TECHNICAL FIELD

The subject matter described herein relates to augmented reality displays. More particularly, the subject matter described herein relates to a wide field of view augmented reality see through head mountable display with distance accommodation.

BACKGROUND

Augmented reality head mountable displays display augmented reality images on display surfaces typically mounted on a frame and positioned near each of a user's eyes. Because the display surfaces are located near the user's eyes, such displays are also referred to as near eye displays. One particular type of near eye display is a see through display, which allows the user to view the real world through the display surfaces. Thus, the user sees a combination of the real world and augmented reality images when looking through the display surfaces.

When viewing real world objects, the user's eyes rotate so that the views from the left and right eyes converge at a fixed distance in space corresponding to the location of the real world object being viewed. This distance is referred to herein as the vergence distance. The user focuses on real world objects at the vergence distance through changes in the pupil aperture size.

Augmented reality images displayed to a user via a near eye see through head mountable display appear to be in focus at a distance defined by the optics of the display system. If the distance at which an augmented reality image appears to be in focus matches the vergence distance where the user's eyes are currently focusing on a real world object viewed through the display, the user will simultaneously perceive the real object and augmented reality image to be in focus. However, if the vergence distance does not match the distance at which the augmented reality image appears to be in focus, the augmented reality image may appear blurry or unnaturally proportioned with respect to the real world objects being viewed.

In some augmented reality head mountable displays, the distance from the user's eyes at which the augmented reality images appear to be in focus is fixed. As a result, when the user is viewing different objects in the real world at different distances from the user's eyes, the augmented reality images may appear out of focus at some distances. Displaying augmented reality images to the user that are out of focus at some distances may result in user discomfort when the user tries to simultaneously view augmented reality images and real world images that are in focus at different distances.

Some augmented reality head mountable displays utilize varifocal mirrors to rapidly vary the distance at which augmented reality images appear in focus by vibrating the surface of the mirror on which the images are viewed. The rate of vibration is faster than the human eye can focus on a specific distance, which is intended to increase the depth of field at which the augmented reality images are perceived to be in focus. However, such vibration is not based on the vergence distance of the user's eyes and can result in a mismatch between the vergence distance and the distance(s) at which the augmented reality images appear to be in focus. Another problem with some augmented reality head mountable displays that use varifocal mirrors is that the displays are not see through displays and thus require complex optics to place the virtual and real world images in front of the user's eyes. Still another problem with some augmented reality head mountable displays is that they present a narrow field of view to the user. For example, some near eye see through displays present a field of view of about 30 degrees for each eye.

Accordingly, in light of these difficulties, there exists a need for a wide field of field of view head mountable display with distance accommodation.

SUMMARY

A head mountable augmented reality see through near eye display system includes a see through augmented reality image focal distance modulator for changing a distance at which augmented reality images appear in focus and including at least one light transmissive surface through which real world objects are viewable. The system further includes a display for generating an augmented reality image and projecting the augmented reality image onto the see through augmented reality image focal distance modulator. The system further includes an augmented reality image focal distance controller for controlling the see through augmented reality image focal distance modulator to cause the augmented reality image to appear in focus a distance corresponding to a vergence distance and for changing the distance at which the augmented reality image appears to be in focus in correspondence with changes in the vergence distance.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIGS. 1B-1D are schematic diagrams illustrating different implementations of an augmented reality image focal distance modulator according to different aspects of the subject matter described herein.

In FIG. 2, an image on the display above the user's eye reflects from the deformable membrane mirror toward the eye.

FIG. 3 illustrates perimetric charts in degrees showing calculated visible field of view of different sample designs for a right eye of a user while gazing statically forward.

FIG. 10 illustrates photographs of the result of a deformation test to estimate usability over a lifetime of the deformable membrane mirror used in the experiments described herein.

DETAILED DESCRIPTION

Figure 1A:
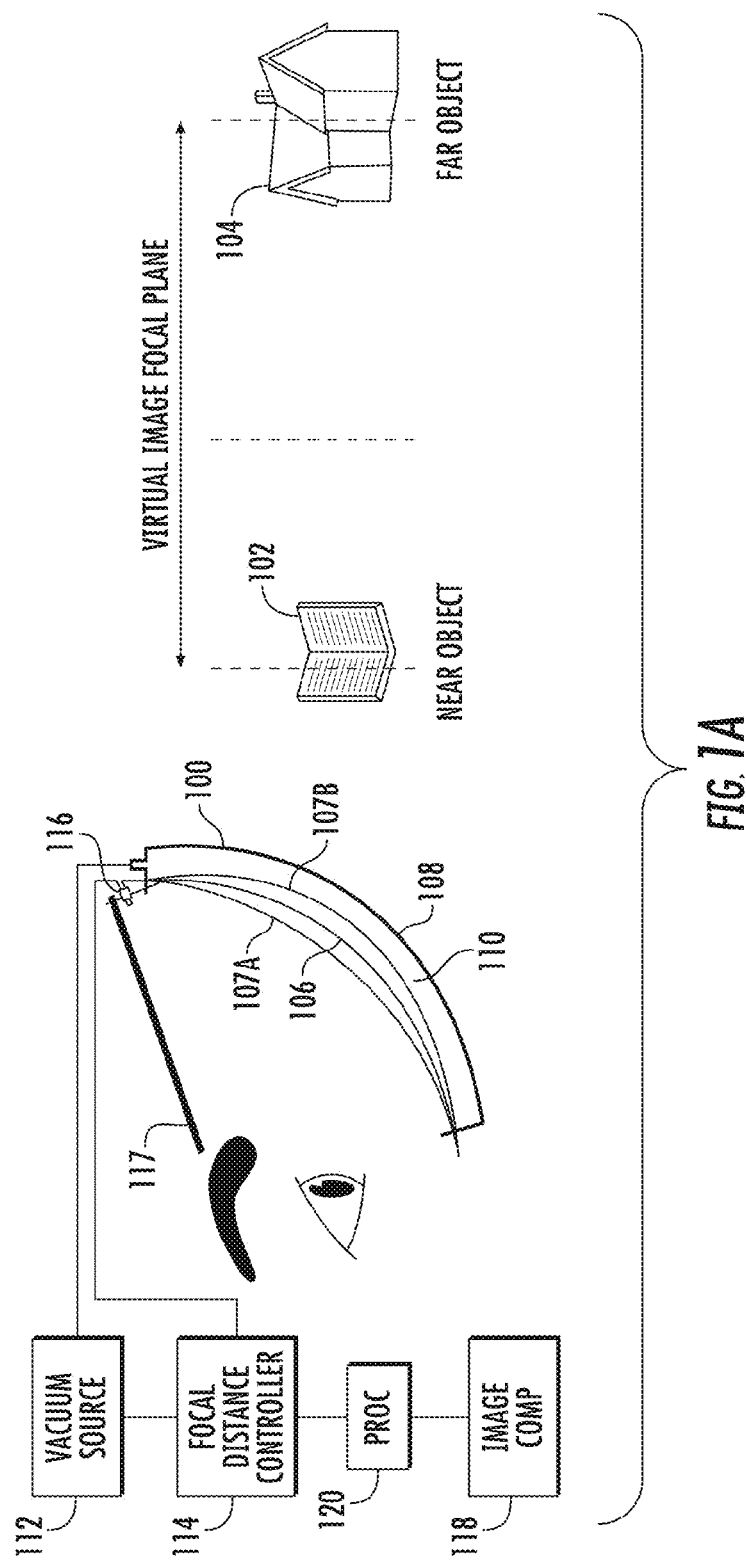
FIG. 1A is a schematic and block diagram of an augmented reality display system according to an aspect of the subject matter described herein.

Accommodative depth cues, a wide field of view, and ever-higher resolutions all present major hardware design challenges for near eye displays. Optimizing a design to overcome one of these challenges typically leads to a trade-off in the others. The subject matter described herein addresses this problem by introducing an all-in-one solution—a new wide field of view gaze-tracked near eye display for augmented reality applications. One aspect of the subject matter described herein is the use of two see through varifocal deformable membrane mirrors reflecting a display. The see through varifocal deformable membrane mirrors are positionable in front of a user's eyes. In one exemplary implementation, the shape of the mirrors is controlled by changes in pressure in pressure chambers, which changes the effective focal power to present a single image at a target depth plane which is determined by a gaze tracker. The benefits of using the membranes include wide field of view (100° binocular diagonal field of view, including stereo overlap between the viewer's eyes) and fast depth switching (from 20 cm to infinity within 300 milliseconds (ms). An experiment described herein verifies the prototype and demonstrates its potential benefits for near eye see through displays.

1 Introduction

Augmented Reality (AR) [7] overlays computer generated visuals onto the real world in real time. Near eye Displays (NEDs) for AR applications have recently been proposed for widespread public use, such as Meta (see https://www.metavision.com), and Microsoft HoloLens (see http://www.microsoft.com/microsoft-hololens/en-us). Some of the fundamental limitations [23] of existing NEDs for AR are limited field of view (FOV), low angular resolution, and fixed accommodative state, which refers to the depth at which augmented reality images appear in focus. For example, the Microsoft HoloLens display displays synthetic images to appear in focus at a fixed depth, regardless of the accommodative state of the user's eyes.

Computational methodologies such as light fields [14, 24] can provide accommodative cues while enabling wide FOV. However, light field displays are known to be computationally intensive and limited in angular resolution. Always-infocus methodologies [1, 28] can imitate accommodative cues in computational means, while providing large FOV with a small form factor, but are limited in angular resolution. Varifocal techniques [27, 33] provide high angular resolution and accommodative cues, but none of these systems have achieved a wide FOV up until now. Recent studies show evidence that supporting accommodative cues through a varifocal mechanism improves visual comfort [16] and user performance [33] while being computationally simpler than volumetric displays. Researchers have also proposed several classical optical designs [2, 19, 32, 38] to address only FOV-related issues without addressing accommodative cues related issues. As demonstrated by Benko et al. [3], combining a NED with projections promises larger FOV with no accommodative cues, but it introduces new practical challenges.

The subject matter described herein addresses the problem of providing wide FOV and accommodative cues together in the context of see through and varifocal systems. By bringing the idea of hyperbolic half-silvered mirrors [19] and deformable membrane mirrors [34, 31, 30] together for NEDs in AR applications, the subject matter described herein includes a new hybrid hardware design for NEDs that uses see-through deformable membrane mirrors. We present a complete prototype including gaze trackers that promises to address Vergence-Accommodation Conflict (VAC) [11] caused by lack of accommodative cues. We validate the performance of our accommodation control in a subjective experiment.

1.1 Contributions

Exemplary contributions of the subject matter described herein include:

Single Element Optics:

Our design employs a single optical element as the varifocal relay optics, simplifying the design of see through varifocal optical systems for NEDs in AR applications. We present a ray tracing model for exploring the design space of our proposal.

Wide Field of View:

With respect to other varifocal optical components, our optical element is unique due to its large aperture size, leading to wide FOV NED solutions for AR applications. We present different design scenarios leading to wide FOV, accurate defocus blur, and demonstrate a wide FOV prototype.

Vergence-Accommodation Conflict:

We verify our gaze tracked prototype through a subjective test. Our findings indicate the ability to address Vergence-Accommodation Conflict (VAC) in a gaze-driven way.

Complete Prototype:

As a proof of concept, we demonstrate a binocular varifocal NED prototype with gaze tracking capability, created by modifying off-the-shelf items, and in-house custom built deformable see through mirrors. We provide details of our implementation.

Unlike for other methodologies, the computational requirements of image generation for a varifocal system are almost the same as today's conventional NEDs. Thus, we believe a varifocal system is very likely to be a design choice in next generation NEDs. The easy-to-follow manufacturing and implementation processes described herein may provide a reproducible methodology for researchers and manufacturers.

2 Related Work

Enabling accommodative cues is known to cause major changes in a NED's optical design. We revise the designs that have enabled accommodative cues, investigate their characteristics, and provide a comparison of these solutions in Table 1.

a NED for AR applications that combines recent advancements of free-form relay optics with a computational integral imaging methodology, achieving 15° of diagonal FOV with a maximum image resolution of 640×360 pixels (px). Although rendering of images is instant, the freeform optics in their design use 3 different 10th order polynomial lenses made of polymethyl methacrylate (PMMA), which requires an access to precision machinery for replication of the work.

Lanman and Luebke [24] introduce a Near Eye Light Field Display (NELD) that uses microlenses as the relay optics, showing a prototype with a resolution of 146×78 px with a FOV of 29.2°×16.0°, leading to a resolution of 2-3 cycles per degree (cpd). More recently, Huang et al. [14] evolved NELDs for virtual reality (VR) applications further, demonstrating a light field stereoscope with a diagonal FOV of 110°, an accommodation range of 5.26 to 0:81 diopters, and a maximum image resolution of 640×800 px (3-4 cpd). The prototype from Huang et al. employs two Liquid Crystal Displays (LCDs) and a pair of classical magnifiers. The introduced technique also promises continuous depth information with a computational overhead that demands usage of high-end GPUs, and presents online images at a typical rate of 20-35 frames per second (fps).

Always-in-focus mechanisms also offer sharp imagery across different focal planes. The work of Akşit et al. [1] uses a pinhole mask in front of a display as a NED for VR applications, and demonstrates full color images at a diagonal FOV of 83° with a resolution of 460×260 px (2-3 cpd). The "Pinlights" always-in-focus AR display using a see through sparse backlight mechanism from Maimone et al. [28] introduces a single color prototype with a diagonal FOV of 110°, and a resolution of 2-3 cpd. The work of

TABLE 1

Comparison of Near-Eye Displays that Enable Accommodative Cues

| | Focus mechanism | See-through | FOV | Angular resolution | Optics | Form factor | Gaze tracker | Computational demand |
|---|---|---|---|---|---|---|---|---|
| Free-form optics [11] | light fields | yes | small | high | complex | moderate | none | high |
| Near-eye light field displays [21] | light fields | no | small | low | simple | thin | none | high |
| Light field stereoscope [12] | light fields | no | large | low | simple | moderate | none | high |
| Pinlight displays [24] | always-in-focus | yes | large | low | simple | thin | none | moderate |
| Pinhole displays [1] | always-in-focus | no | large | low | simple | thin | none | moderate |
| Holographic optical elements [17] | holographic | yes | N/A | N/A | complex | N/A | none | high |
| Multi-focal plane displays [10] | multi-plane | yes | small | high | complex | bulky | none | high |
| Focus tunable light engine [23] | varifocal | yes | small | high | moderate | N/A | none | N/A |
| Focus tunable lenses [29] | varifocal | no | small | moderate | moderate | moderate | none | moderate |
| This work | varifocal | yes | large | moderate | simple | bulky | available | moderate |

Our work is distinguishable as the first proposal to demonstrate a wide field of view see through system with improved resolution Integral Imaging, first proposed by Lippmann [26], deals with the capture and the reproduction of light fields, which with enough angular resolution can provide correct accommodative cues to a viewer. Hua and Javidi [13] demonstrate Maimone et al. can also provide full-color imagery with 12 Hz refresh rate. Both of these implementations suffer the primary disadvantage of poor angular resolution.

Researchers have shown a growing interest in the use of Holographic Optical Elements (HOEs) in NED designs [18]. Holography promises a good angular resolution with a thin form factor, but to our knowledge no implementation of HOEs inside a complete NED has yet been demonstrated. We believe achieving high FOV will be the major practical challenge in holographic NED research.

The work of Hu and Hua [12] presents a see through multi-plane NED using Deformable Mirror Membrane Devices (DMMDs) that provide 1 kHz refresh rate. Their prototype provides a 40° diagonal FOV, and an image resolution of 1024×768 px, leading to resolvability of 9-12 cpd. However, the optical complexity in such approaches has to date challenged their practicality in increasing angular resolution and decreasing form factors.

A varifocal system by Liu et al. [27] uses a tunable lens system combined with a spherical mirror, and demonstrates 28° of diagonal FOV, 800×600 px resolution (10-14 cpd), and an accommodation range of 0 to 8 diopters. The work of Liu et al. switches depth from one extreme to another within 74 ms. A recent study by Konrad et al. [33] again takes advantage of an electrically tunable lens system as relay optics, and demonstrates 36° diagonal FOV. The work of Konrad et al. switches depth from one extreme to an another within 15 ms (600 diopters per second), and provides a maximum image resolution of 488×488 px (5-6 cpd) and an accommodation range of 9.5-0 diopters. Konrad et al. also proposes an interesting drive scenario through monovision. A detailed perceptual study on monovision was also conducted recently by Johnson et al. [15].

A more comprehensive review can also be found in the work of Kramida et al [22]. To our knowledge, our proposal is the first approach promising a see through single element varifocal NED with wide FOV, gaze trackers, and improved angular resolution.

3 System Overview

FIG. 1A is a schematic and block diagram illustrating exemplary components of the subject matter described herein. Referring to FIG. 1A, the system includes a see through augmented reality image focal distance modulator 100, which in the illustrated example is a varifocal mirror. The see-through augmented reality image focal distance modulator 100 changes a distance at which virtual objects appear to be in focus to a user and allows the user to view real world objects 102 and 104 through the display surfaces. See through augmented reality image focal distance modulator 100 includes a deformable membrane mirror 106 and a rigid transparent surface 108 to which deformable membrane mirror 106 is attached. Deformable membrane mirror 106 and rigid transparent surface 108 form a pressure chamber 110. A vacuum source 112 (such as a vacuum pump) connected to pressure chamber 110 controls the pressure in pressure chamber 110 and deforms membrane mirror 106 to different positions to change the depth at which virtual objects appear in focus. For example, as deformable membrane mirror 106 deforms to position 107A, the augmented reality image focal plane may move towards the user. When deformable membrane mirror 106 moves to position 107B, the augmented reality image focal plane may move away from the user. An augmented reality image focal distance controller 114 receives input from gaze tracking cameras 116 (one for each of the user's eyes) to control the augmented reality image focal distance modulator 100 to display virtual objects to the user in focus at fixed distances corresponding to the vergence plane of a user's eyes. For example, when the user focuses on a near object 102, focal distance controller 114 may control vacuum source 112 to deform deformable membrane mirror 106 such that the augmented reality images appear to be in focus at the distance of near object 102 from the user. When the user focuses on a far object 104, focal distance controller 114 controls vacuum source 112 to deform deformable membrane mirror 106 such that the distance at which virtual objects appear in focus corresponds to the distance of far object 104 from the user. Display 117 displays augmented reality images to the user. The term "augmented reality images" refers to any images generated by display 117. Such images can be images of real world objects or computer generated images, such as text or graphical images that are generated and are intended to be superimposed on the user's view of the real world scene. An image compensator 118 compensates for distortion in displayed images caused by deformation of deformable membrane mirror 106 on which the augmented reality images are projected. Focal distance controller 114 and image compensator 118 may be executed on a processor 120. The components illustrated in FIG. 1A may be mounted to a frame (not shown) that is part of an augmented reality near eye head mountable display that attaches to a user's head. Examples of such display frames suitable for use with the subject matter described herein include eyeglasses frames, helmets, and goggles.

One aspect of the subject matter described herein that should be noted is the simplicity of the optical design illustrated in FIG. 1A. For example, because augmented reality image focal distance modulator comprises a see through display, augmented reality image focal distance modulator 100 can be placed in front of a user's eyes without complex optics to place the images displayed on augmented reality image focal distance modulator 100 in front of the user's eyes.

The positioning of display 117 above augmented reality image focal distance modulator 100 such that display 117 does not block the user's view further contributes to the simplicity in optical design. In the illustrated example, display 117 faces deformable membrane mirror 106, and deformable membrane mirror is tilted with respect to rays exiting horizontally from the user's eye so that images of virtual objects to be projected onto deformable membrane 106 and reflected toward and into the user's eye.

In the example illustrated in FIG. 1A, focal distance modulator 100 includes a single vacuum chamber. In an alternate implementation, focal distance modulator 100 may include two separate vacuum chambers, one in front of deformable membrane mirror 106 and the other behind deformable membrane mirror 106. Such an example is illustrated in FIG. 1B. In FIG. 1B, deformable membrane mirror 106 is located between a first vacuum chamber 150 and a second vacuum chamber 152. Deformation of deformable membrane mirror 106 may be achieved by controlling the pressure difference between vacuum chambers 150 and 152. For example, increasing the pressure in chamber 150 relative to that in chamber 152 may cause membrane 106 to deform towards chamber 152 as indicated by dashed line 107B so that the distance from the user at which virtual objects appear to be in focus moves away from the user. Increasing the pressure in chamber 152 relative to that in chamber 150 causes membrane 106 to deform towards chamber 150 as indicated by dashed line 107A and thereby decrease the distance from the user at which augmented reality objects appear to be in focus.

In yet another alternate implementation, membrane 106 may be implemented using a mechanically expanding diaphragm. Such a diaphragm may have an accordion-like profile, as illustrated in FIG. 1C. In FIG. 1C, deformable membrane mirror 106 may be expanded to position 107B to move the augmented reality image focal plane away from the user and to position 107A to move the augmented reality image focal plane towards the user. Movement of diaphragm 106 may be achieved through mechanical means, for example, using servomotors to expand and contract deformable membrane mirror 106 or using pressure or differential pressure, as illustrated in FIGS. 1A and 1B.

FIG. 1D illustrates yet another alternate implementation of diaphragm 106. In FIG. 1D, deformable membrane 106 includes magnetic nanoparticles 154 embedded within membrane 106. In such an implementation, membrane 106 may be deformable between positions 107A and 107B through application of magnetic force to nanoparticles 154. It should also be noted that the embodiments illustrated in FIGS. 1C and 1D can be used in combination with the vacuum chamber(s) illustrated in FIGS. 1A and 1B to facilitate force application or to provide zero pressure differential on opposing sides of membrane 106 so that movement of membrane 106 through application of mechanical or magnetic force requires less energy.

According to yet another aspect of the subject matter described herein, membrane 106 may, instead of holding a desired shape, may vibrate or continually sweep between near and far focal distance positions. In such an implementation, display 117 may be globally flashed at the proper time when the membrane is deformed to the desired depth or locally flashed at different times according to different virtual object depths.

Figure 1E:
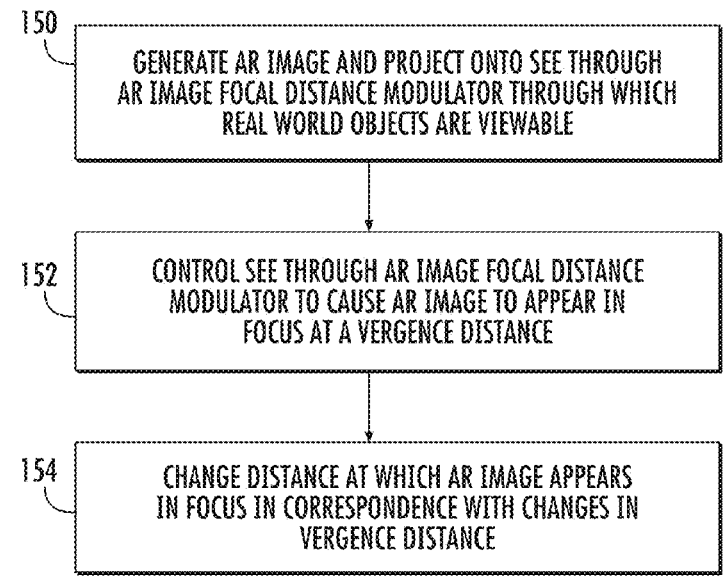
FIG. 1E is a flow chart illustrating an exemplary process for controlling an augmented reality display according to an aspect of the subject matter described herein.

FIG. 1E is a flow chart illustrating an exemplary process for controlling an augmented reality display system according to the subject matter described herein. Referring to FIG. 1E, in step 150, an augmented reality image is generated and projected onto a see through augmented reality image focal distance modulator through which real world objects are viewable. For example, display 117 illustrated in FIG. 1A may generate an augmented reality image and project the augmented reality image onto deformable membrane mirror 106, which reflects the augmented reality image into the user's eye.

In step 152, the see through augmented reality image focal distance modulator is controlled to cause the augmented reality image to appear in focus at a vergence distance. For example, cameras 116 may track the user's gaze, and focal distance controller 114 may determine the vergence distance based on the tracked gaze of the user. Focal distance controller 114 may then deform deformable membrane mirror 106 so that the distance at which the augmented reality image appears in focus corresponds to the vergence distance.

In step 154, the distance at which the augmented reality image appears in focus changes in correspondence with changes in the vergence distance. For example, cameras 116 may continually track the gaze of the user's eyes, and focal distance controller 114 may continually calculate the vergence distance. As the vergence distance changes, the distance at which the augmented reality image appears in focus may change correspondingly. Unlike systems where the varifocal mirror continually vibrates through a range of deformations without regard to the vergence distance, the curvature of the varifocal mirror described herein is changed to track changes in the vergence distance.

Figure 2:
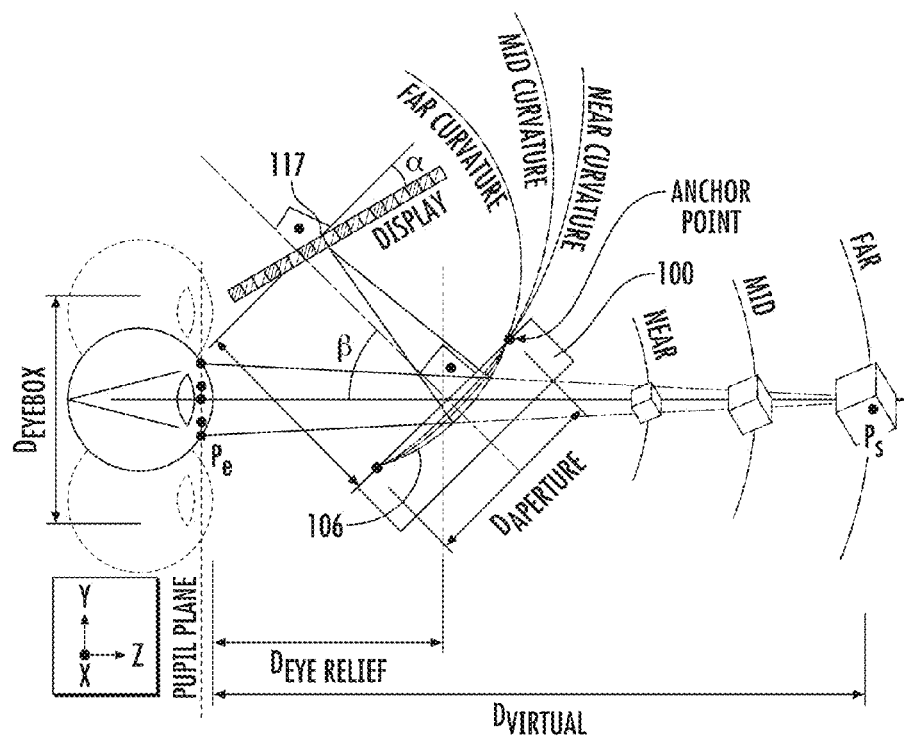
FIG. 2 is a schematic diagram illustrating an optical layout for the single eye case of a deformable membrane mirror and a display with respect to the user's eye.

The goal of the varifocal see through NED described herein is to place an augmented reality image at a variable focal distance from a human subject's eyes, where the variable focal distance is controlled to match the distance at which the user's eyes are converging. We approach the problem of designing optics for a see through NED with a layout shown in more detail in FIG. 2. In FIG. 2, display 117 is located above a user's eye is reflected from deformable membrane mirror 106 towards the user. Assuming a mechanism causing a uniform deflection of the membrane, a deformable membrane mirror approximates a spherical concave reflective surface, defined as $$(x-x_0)^2+(y-y_0)^2+(z-z_0)^2=r^2, \quad (1)$$

where (x, y, z) defines the points on the sphere surface, $M_c=(x_0, y_0, z_0)$ defines the coordinates of the sphere center, and r defines the radius of the curvature. As a result of the deflection, the user perceives the augmented reality image at different focal depths that depend on the mirror curvature.

We start our design (FIG. 2) by placing a flat deformable membrane mirror 106 in front of an eye with a certain eye relief $d_{eye\ relief}$ and aperture size $d_{aperture}$. We tilt the membrane with an angle β around the x axis. We then place display 117 at a distance $d_{display}$ from deformable membrane mirror 106, and tilt it with an angle α. Desired eye-box size, $d_{eye\ box}$, and $d_{aperture}$, $d_{eye\ relief}$, α, β, $d_{display}$ are parameters of our design.

3.1 Ray Tracing Model

We approached the problem of calculating the required mirror curvatures for a given configuration through a three-dimensional (3D) ray tracing model [39]. The objective of our ray tracing model is to find a good mirror curvature that creates the smallest resolvable spot size.

The first step of our model defines sample points $p_e$ inside a given $d_{eye\ box}$. Next, we define a sample point $p_s$ at a desired depth $d_{virtual}$. We define multiple rays from points inside an eye box traveling to a sample point in depth. A single one of these rays $R_0$ is defined as $$R_0 = \begin{cases} p_e = \begin{bmatrix} p_{e_x} \\ p_{e_y} \\ p_{e_z} \end{bmatrix}, \\ a_e = \dfrac{1}{d_{es}} \begin{bmatrix} p_{s_x} - p_{e_x} \\ p_{s_y} - p_{e_y} \\ p_{s_z} - p_{e_z} \end{bmatrix}, \end{cases} \quad (2)$$

where $p_e$ indicates a starting point, $a_{es}$ indicates direction cosines of the ray, and $d_{es}$ indicates the distance between $p_e$ and $p_s$. We trace $R_0$ from pupil plane to deformable membrane mirror 106. Note that FIG. 2 shows two anchor points for deformable membrane mirror 106. Any given sphere that has such anchor points at both axis (X and Y) by definition is on the line that is perpendicular to the flat mirror surface, and crosses the center of the flat mirror surface. Assuming a configuration as in FIG. 2, such a line can be defined as $z=-\tan(β)y+d_{eye\ relief}$, leading to $M_c=(0, y, z)$. The intersection point between a deformable membrane and $R_0$ can be calculated by finding a ray propagation distance $d_0$ that satisfies the sphere equation on the surface of the membrane with a point $p_{mirror}=(p_e+d_0\ a_{es})$. Thus, ray propagation distance can be calculated by finding the roots of $$\|p_{mirror}-M_c\|=r, \quad (3)$$

and choosing the closest root to the plane of the deformable membrane mirror. A surface normal $R_{n0}$ of deformable membrane mirror 106 at a point can be calculated as $$R_{n_0} = \begin{cases} n_{mirror} = p_{mirror}, \\ a_{mirror} = \dfrac{p_{mirror} - M_c}{\|p_{mirror} - M_c\|}. \end{cases} \quad (4)$$

Using $R_{n0}$ and $R_0$, we calculate the reflection as a ray $R_1$ which can be calculated as $$R_1 = R_0 - 2R_{n0}(R_0 \cdot R_{n0}). \quad (5)$$

To calculate the intersection of $R_1$ with a display plane, we need to be able to calculate two things: (1) surface normal of our display plane and (2) ray propagation distance $d_1$ from the origin of the ray to a display plane. The surface normal of our display plane $R_{n1}$ can be calculated as $$R_{n_1} = \begin{cases} p_{display} = \begin{bmatrix} 0 \\ \sin(\beta) d_{display} \\ d_{eye\ relief} - \cos(\beta) d_{display} \end{bmatrix}, \\ a_{display} = \begin{bmatrix} 0 \\ \sin(\beta + \alpha) \\ \cos(\beta + \alpha) \end{bmatrix}. \end{cases} \quad (6)$$

Using the surface normal and a vector $R_2$ from $p_{mirror}$ to $p_{display}$, $d_1$ can be calculated as $$d_1 = \frac{R_{n_1} \cdot R_2}{R_{n_1} \cdot R_1}, \quad (7)$$

and finally, we can find the intersection point as $p_{final} = p_{mirror} + d_1 a_{R1}$. We use the intersection points to calculate the spot size, in which Full Width Half Maximum (FWHM) size of the spot diagonal is calculated using FWHM=2:355σ. Using secant method, we optimize the curvature of the deformable mirror membrane by minimizing FWHM size for a given configuration. We choose a new curvature $r_{new}$ at each iteration as $$r_{new} = r_{current}\left(1 - \frac{FHWM_{current} - FWHM_{previous}}{r_{current} - r_{previous}}\right). \quad (8)$$

3.2 Design Space

Here we explore the design space of our proposal using our ray tracing model to identify the impact of $d_{eye\ relief}$, $d_{display}$, and $d_{aperture}$. First we will analyze $d_{aperture}$, which is defined both in the vertical and the horizontal axis. In our designs, the aperture shapes are chosen as either circular or elliptical. Adult humans have a mean interpupillary distance (IPD) of 63 mm, and their IPDs can range between 50 and 75 mm [8]. Thus, horizontal aperture size is dictated by IPD in the nasal direction. Maximum aperture size at a vertical axis can be at any desired size to cover a larger vertical FOV. Note that user's eyes can be decentered with respect to the optical axis of a deformable membrane mirror, thus we choose to use $d_{eye\ box}$=20 mm to compensate for alignment as in the case of a conventional NED design. Designs with elliptical aperture shapes can introduce a perceivable astigmatism in an optical system, such cases can easily be corrected by placing a single axis lens in between a display and a deformable membrane mirror. Sample designs in FIG. 3 demonstrate our findings on the effects of $d_{eye\ relief}$ and $d_{aperture}$ on FOV. More particularly, FIG. 3 illustrates perimetric charts in degrees showing calculated visible field of view of different sample designs for a right eye of a user while gazing statically forward. In both sketches, line 300 represents the average field of view of a person, circle 301 represents the foveal region, and dashed line 302 represents the field of view of a typical consumer level near eye display for augmented reality applications. Angular positions of facial features are highlighted as brow, nose, and cheek. The top figure shows different variations of field of view for different versions of eye relief $d_{eye\ relief}$. Calculations are based on a vertical aperture size of $d_{aperture}$=65 mm, a horizontal aperture size of $d_{aperture}$=50 mm, and deformable membrane mirror tilt β=45°). The bottom figure shows variation of field of view for different values of $d_{aperture\ v}$ and $d_{aperture\ h}$. Calculated values in the bottom figure are based on $d_{eye\ relief}$=34 mm and β=45°.

Sample designs in FIG. 3 demonstrate our findings on the effect of $d_{eye\ relief}$ and $d_{aperture}$ on FOV. These results suggest that shorter $d_{eye\ relief}$ and larger $d_{aperture}$ promise a larger FOV. We would like to highlight that majority of our designs promise a larger FOV than a typical NED for AR applications. The main limitation of our designs comes from the limited FOV generation towards the brows due to the β angle of the membrane mirror causing a more distant reflector in that region. Note that an asymmetrical aperture in different directions (brow, nose, cheek, peripheral), different aperture shapes (square, custom) or offsetting and angling the central axis of the membrane are possible solutions to overcome limited FOV towards the nose and the brow. However, non-elliptical designs require a more complex multi-domain modeling, leading to complex surface deformations largely deviating from regular spherical or aspherical surfaces, while off-axis designs degrade the optical qualities of the reflected image. Increasing the aperture size will also lead to clipping the reflections of the display particularly in the bottom region which reflects the portion of the display that abuts the brow.

Figure 4:
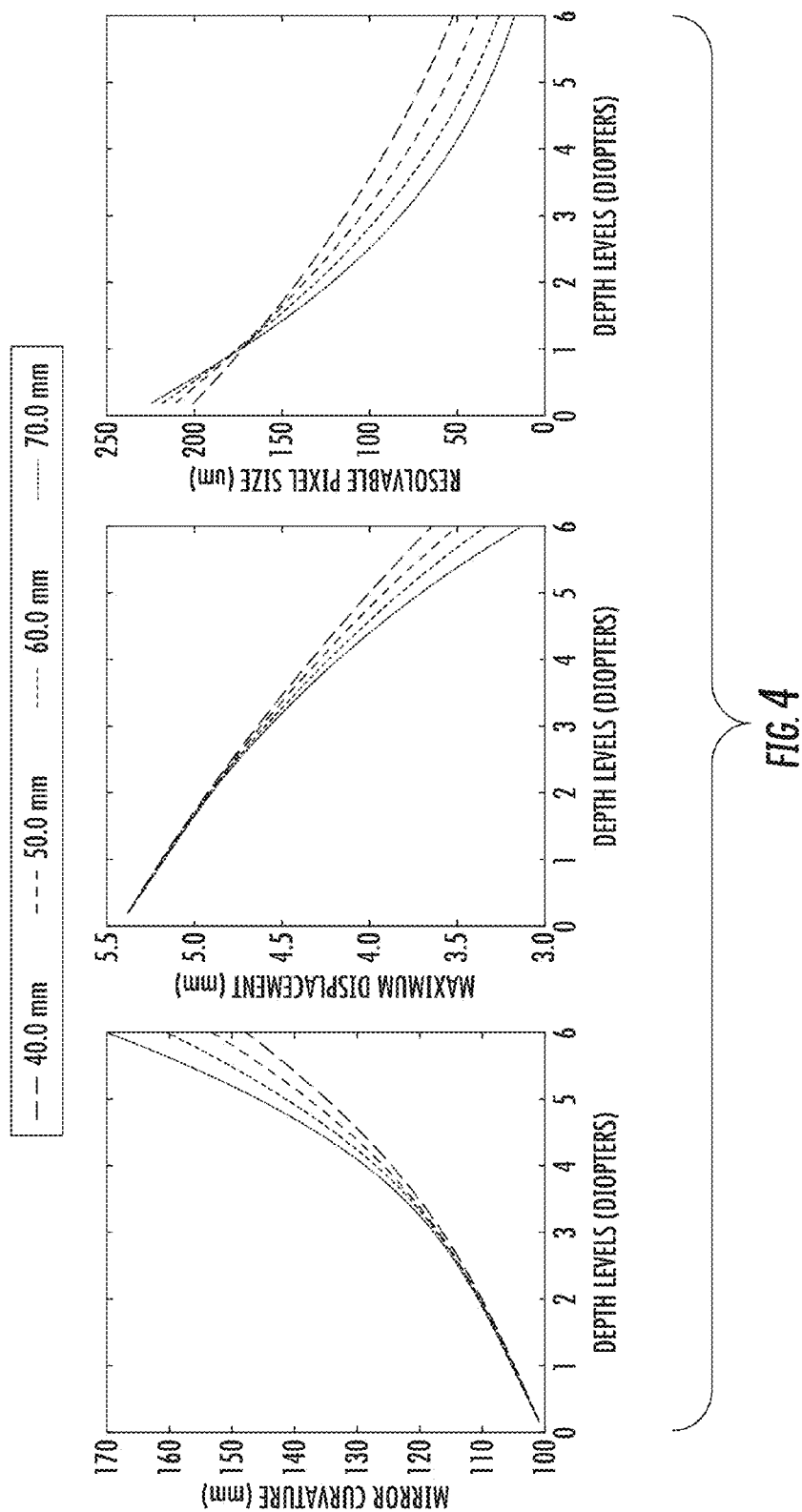
FIG. 4 illustrates graphs of mirror curvature, maximum displacement, and resolvable pixel size for depth levels in diopters of an exemplary varifocal mirror design.

We propose a pneumatic system to control the deformations of the membrane mirror. Understanding the required curvature values and maximum displacement for a deformable membrane mirror lets us identify the speed and volume of air movement that dictated the requirements for the pneumatic hardware. We explore the impact of different $d_{eye\ relief}$ and $d_{aperture}$ on curvature, displacement, and resolution by ray tracing to simulate the characteristics of different points in depth aligned with the optical axis. Our ray tracing model suggests that different $d_{eye\ relief}$ leads to different $M_c$ and r configurations meaning the deformable membrane displaces different amounts with respect to the flat mirror case. We show the effect of $d_{eye\ relief}$ with a sample design in FIG. 4. A sample design is evaluated for different eye reliefs $d_{eye\ relief}$ with a configuration of an aperture size $d_{apert}$=50 mm in horizontal axis, an aperture size $d_{aperture}$=65 mm in vertical axis, a mirror tilt β=45°, a screen tilt α=20°, an eye box $d_{eye\ box}$=20 mm, and a screen distance $d_{display,}$=60 mm. For all evaluations, on-axis depth fields as shown in FIG. 2 are chosen at different depth levels. A deformable membrane mirror's curvature is calculated for different depth levels as shown on the left. The maximum amount of displacement required by each depth level is shown in the middle figure. Assuming an eye with an aperture size of 6 mm, resolvable pixel size on a screen inside the given eye box is calculated for different depth levels as shown in the figure on the right. Smaller $d_{eye\ relief}$ benefits the design by decreasing required displacement on a membrane, however resolution improves at closer depths with a larger $d_{eye\ relief}$.

Figure 5:
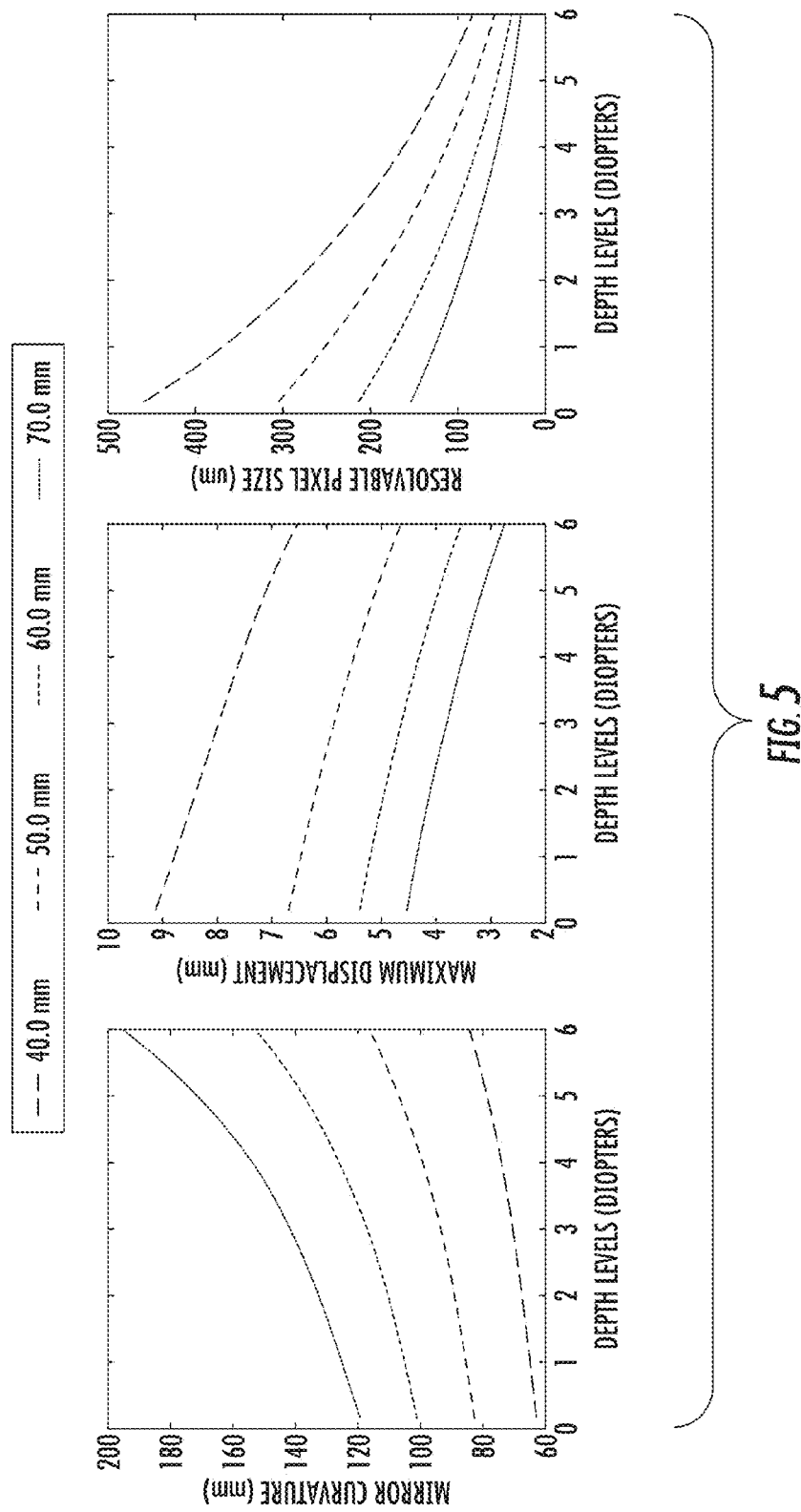
FIG. 5 illustrates graphs of mirror curvature, maximum displacement, and resolvable pixel size for an alternate varifocal mirror design.

Note that shorter $d_{eye\ relief}$ requires less deformation of the deformable membrane mirror, which, as a result, requires more precise pneumatics. On the other hand, larger $d_{eye\ relief}$ provides a smaller resolvable pixel size, leading to more resolution, but as noted above decreases the FOV. We conclude the pixel size dictates the required $d_{eye\ relief}$ in practical designs. We also evaluate the same sample designs for different $d_{display}$, as shown in FIG. 5. A sample design is evaluated for different display distances $d_{display}$ with a configuration of an aperture size $d_{aperture}$=50 mm in horizontal axis, an aperture size $d_{aperture}$=65 mm in vertical axis, a mirror tilt β=45°, a screen tilt α=20°, an eye box $d_{eye\ box}$=20 mm, and a screen distance $d_{eye\ relief}$=50 mm. For all evaluations, on-axis depth fields as shown in FIG. 2 are chosen at different depth levels. A deformable membrane mirror's curvature is calculated for different depth levels as shown on the left. The maximum amount of displacement required by each depth level is shown in the middle figure. Assuming an eye with an aperture size of 6 mm, resolvable pixel size on a screen inside the given eye box is calculated for different depth levels as in the figure on the right. This shows that larger $d_{display}$ increases resolution while decreasing the required amount of deformation on the membrane, but also increases the overall form factor of the complete system while decreasing FOV.

4 Implementation

Figure 6:
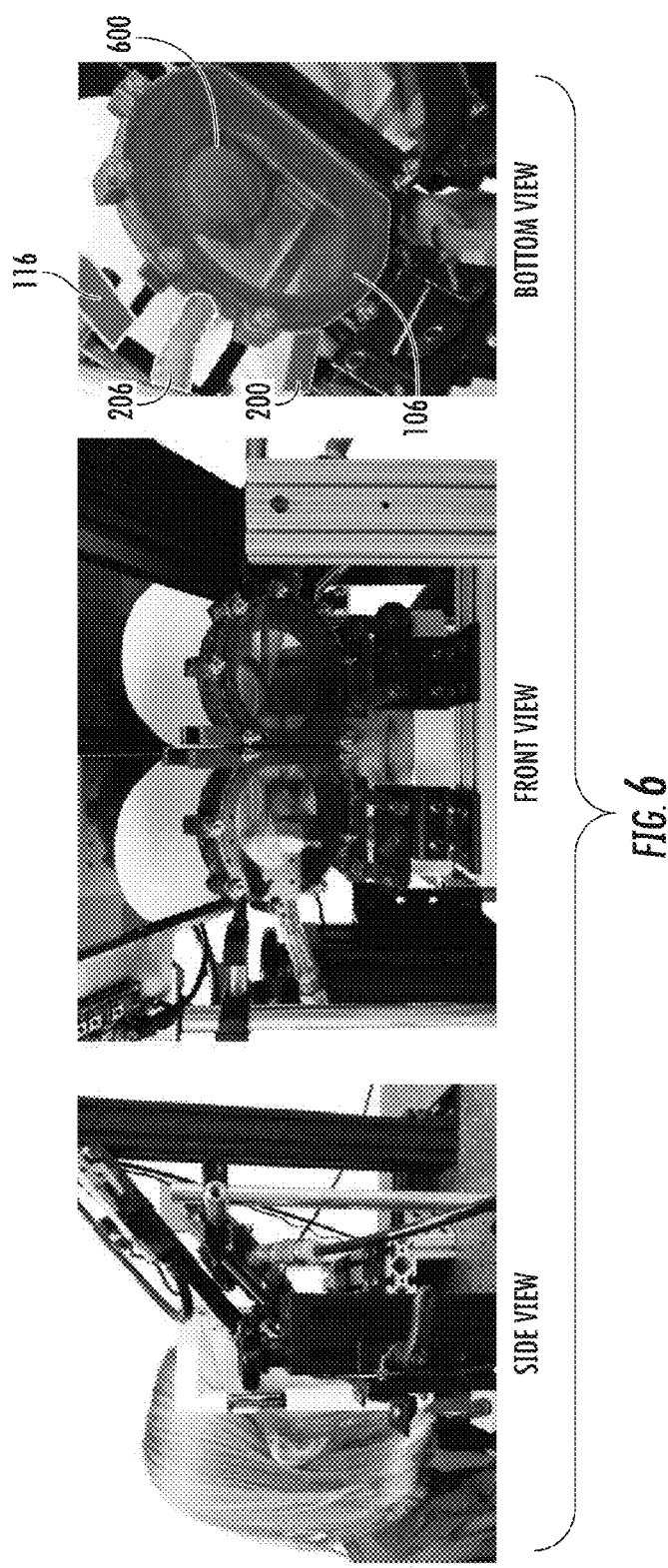
FIG. 6 illustrates photographs of various views of a prototype of a varifocal mirror near eye display, according to an aspect of the subject matter described herein.

We demonstrate our proposal with an experimental see through varifocal NED equipped with a gaze tracker as shown in FIG. 6. All the hardware components used in our final prototype are presented in a system overview diagram as in FIG. 7. More particularly, FIG. 6 illustrates side, front, and bottom views of a wide field of view varifocal mirror near eye display prototype for augmented reality applications. In FIG. 6, the bottom view presents the deformable membrane mirror 106 for the right eye, an additional lens 600 to cover astigmatism in the central regions caused by the elliptical deformable mirror aperture shape, an infrared camera 200 for deformation control, camera 116 for gaze tracking, and vacuum regulator 206 to control the pressure in deformable membrane mirror housing.

Figure 7:
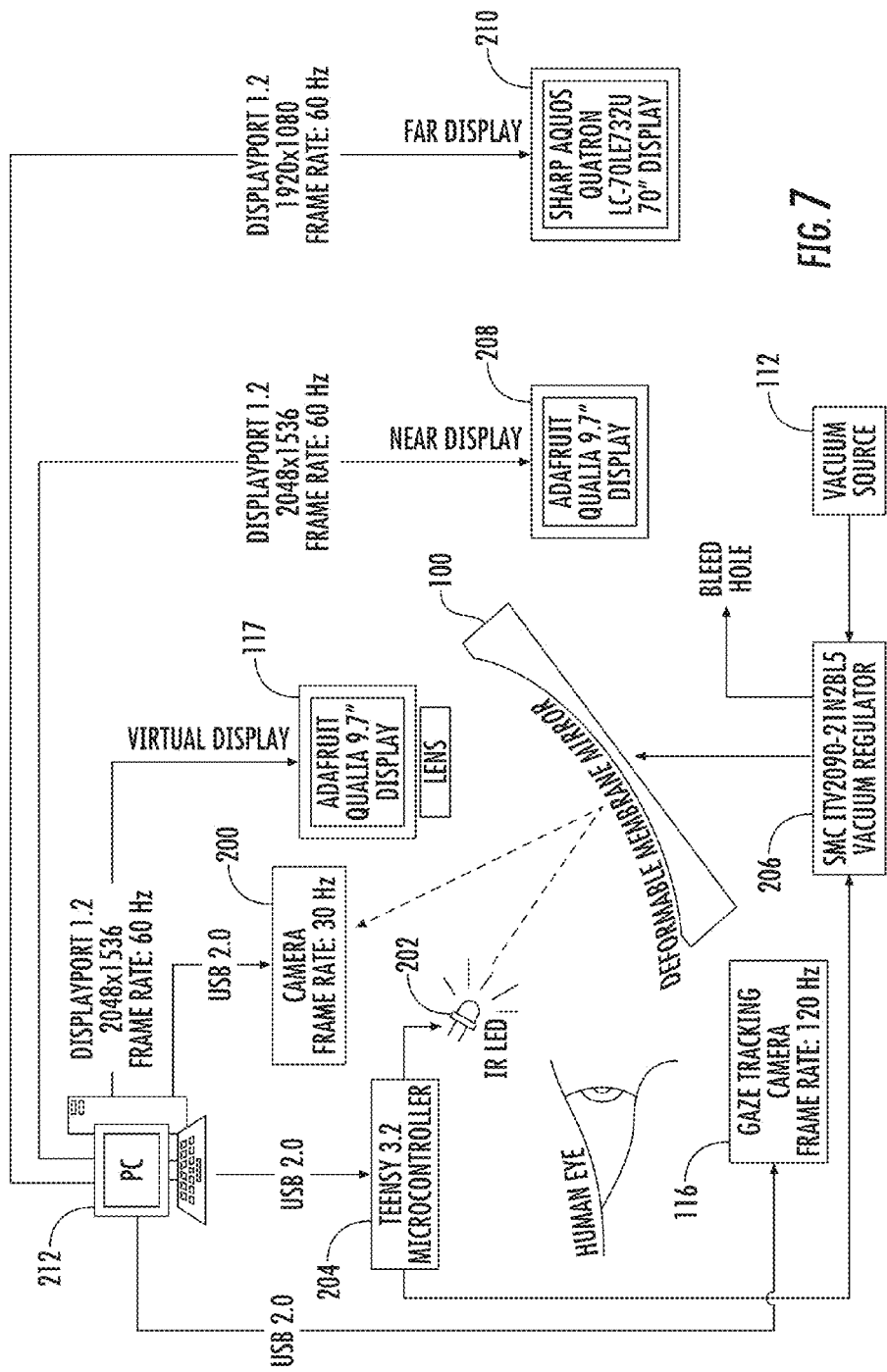
FIG. 7 is a block diagram of the prototype illustrated in FIG. 6.

In FIG. 7, the prototype includes augmented reality image focal distance modulator 100, which in the illustrated example is a deformable membrane mirror. The prototype also includes gaze tracking camera 116 that tracks the user's gaze. Although only a single gaze tracking camera 116 is shown in FIG. 7, it is understood that two gaze tracking cameras 116 (one for each eye) may be included in an exemplary implementation of the subject matter described herein in order to track the gaze of each of the user's eyes so that the vergence distance can be calculated. Deformation tracking camera 200 tracks reflections of an infrared LED 202 controlled by microcontroller 204. Microcontroller 204 also controls gaze tracking camera 116. The purpose of deformation camera 200 is to sense deformations in the deformable membrane for feedback control.

The pressure in vacuum chamber formed by deformable membrane mirror 106 and rigid surface 108 is controlled by vacuum source 112 and vacuum regulator 206. Vacuum source 112 may be a vacuum pump, as illustrated in FIG. 1A. Two displays 208 and 210 display near and far real world images to the user for experiments. Displays 208 and 210 are used in the experiments described herein to provide examples of real world objects on which the user may focus. It is understood that displays 208 and 210 may not be components of an implementation of a head mountable display described herein.

In this section, we explain details of our implementation. The core of the implementation, and the only custom component, is a deformable membrane mirror and its vacuum-tight 3D-printed housing.

4.1 Manufacturing Flexible Membranes

The task of manufacturing custom flexible membranes is accomplished traditionally through surface micromachining, bulk micromachining, liquid crystals, piezoelectric or electrostrictive actuators as reviewed by Mansell et al. [29]. Pneumatic based systems have also been demonstrated for building tunable microoptics using polydimethysiloxane (PMDS) [42], avoiding the use of high voltages or external fields in operation and precise machining in manufacturing. On the other hand, PDMS has numerous attractive material properties such as outstanding transparency in visible wavelengths, high elasticity, and excellent temperature stability. Inspired by these advantages, we created our own recipe for the task.

We used Sylgard 184 PDMS kit purchased from Dow Corning. Sylgard 184 is a two part elastomer kit, with PDMS pre-polymer and a cross-linking agent. The prepolymer was mixed with crosslinking agent at a ratio of 10:1 and mixed vigorously for 3 minutes. The mixture was then degassed for 15 minutes, to remove bubbles incorporated during mixing. 6" Silicon wafers were purchased from University Wafers. The wafer was silanized, to ease membrane release, by being placed in a desiccator, with 20 ul of trichloro (1H,1H,2H, 2H-perfluorooctyl) silane and evacuated for 30 minutes and left under vacuum for 1 hour. Mixed and degassed PDMS prepolymer is spin cast on the Si wafer for 1 min at 300 RPMs to obtain a PDMS membrane of approximately 240 um. The membrane is placed in an oven at 100° C. for 24 hours to produce a repeatable Young's modulus [37]. The membrane was then placed in a commercial physical vapor deposition unit (Kurt Lesker PVD 75) and a 20 nm Ag film is sputtered on the membrane. After metallization the film is carefully peeled and stretched taut across the vacuum housing to form the deformable membrane mirror. Fused Deposition Modeling (FDM) based 3D printers that we have tried were not able to accomplish the task of manufacturing airtight vacuum housing. We manufactured the housing using a Formlabs 2 3D printer, which uses stereolithography technique with liquid photopolymer resins.

Figure 8:
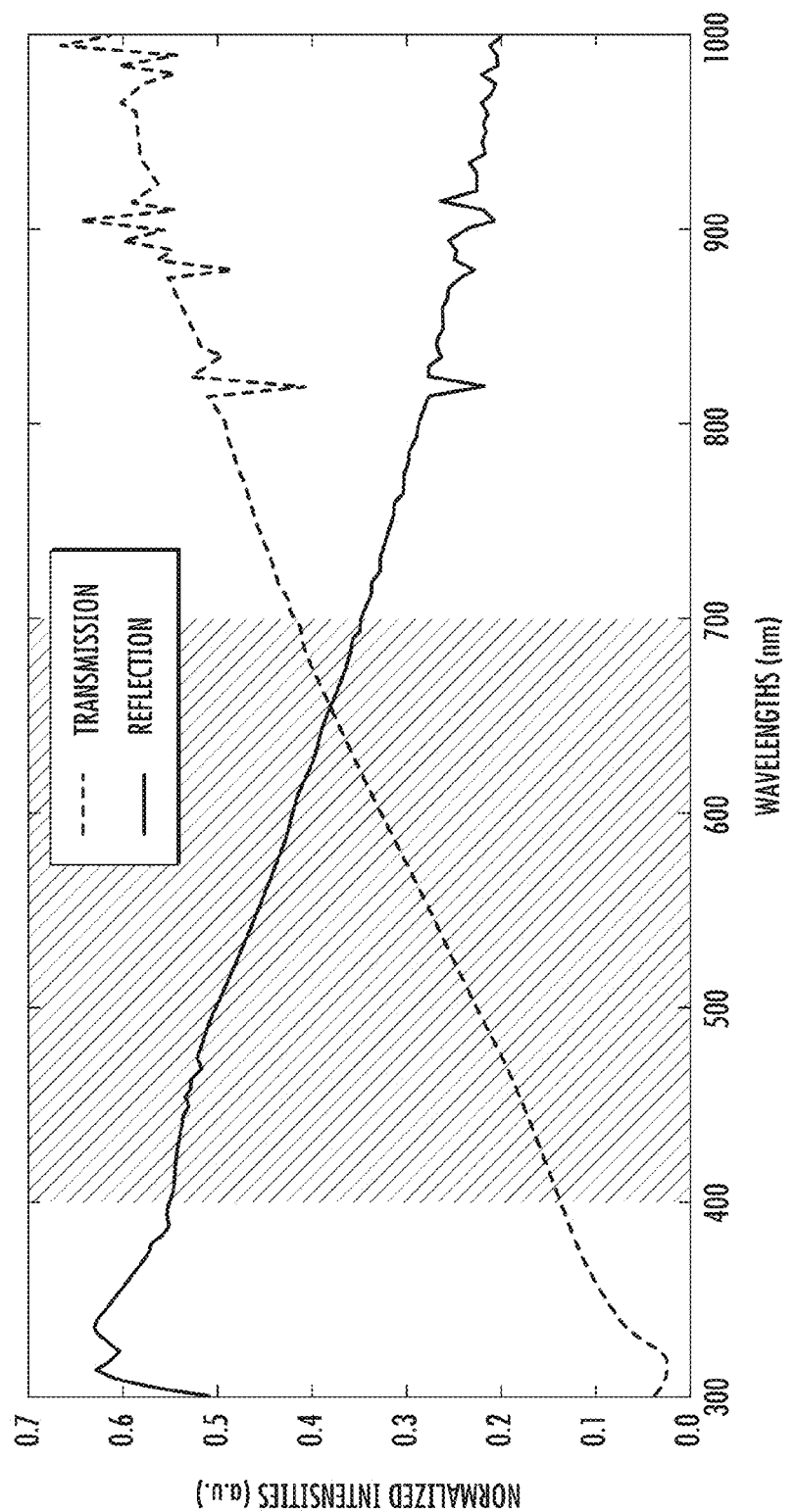
FIG. 8 is a graph illustrating normalized intensities versus wavelengths for the varifocal membrane mirror used in the experiments described herein.

Transmission and reflection characteristics of our deformable membrane mirror were captured as in FIG. 8 using a J. A. Woollam variable angle spectroscopic ellipsometer. The deformable membrane mirror was aligned and the incident angle was set to 40 degrees to match and a for both the transmission and reflection measurements. In particular, FIG. 8 illustrates a graph of wavelength versus normalized intensities of the deformable membrane mirror. The work of Lee et al. [25] highlights that a thickness of an optical combiner plays a crucial role in depth perception, as our membrane mirror has 240 µm thickness, effects described by Lee et al. are expected to be at a negligible level in our implementation.

4.2 Integration

Our choice of design parameters was mainly constrained by the availability of off-the-shelf components, and the costs of custom tooling. Per eye, we use a vacuum source (115 Torr~15 kPa) with a SMC ITV2090-21N2BL5 (see https://www.smcpneumatics.com) vacuum regulator, a t-junction, and a bleed hole to create a controlled partial vacuum environment inside our vacuum housing. Our vacuum regulators can regulate pressure levels in between −1:3 to −80 kPa, and each is controlled by a Teensy 3.2 microcontroller (uC) (see https://www.adafruit.com/product/2756). Our combination of uCs and vacuum regulators provides us ~60 addressable stable depth planes ranging from 0.2 to 7 diopters according to our empirical experiments. We used an Adafruit Qualia 9.7" LCD (see https://adafruit.com/product/1652) with 260 pixels per inch (ppi), active region used per eye is 1050×1260 px. Our prototype uses a gaze tracking Pupil-labs camera (see https://pupil-labs.com/store) per eye, running at 120 Hz.

Figure 9:
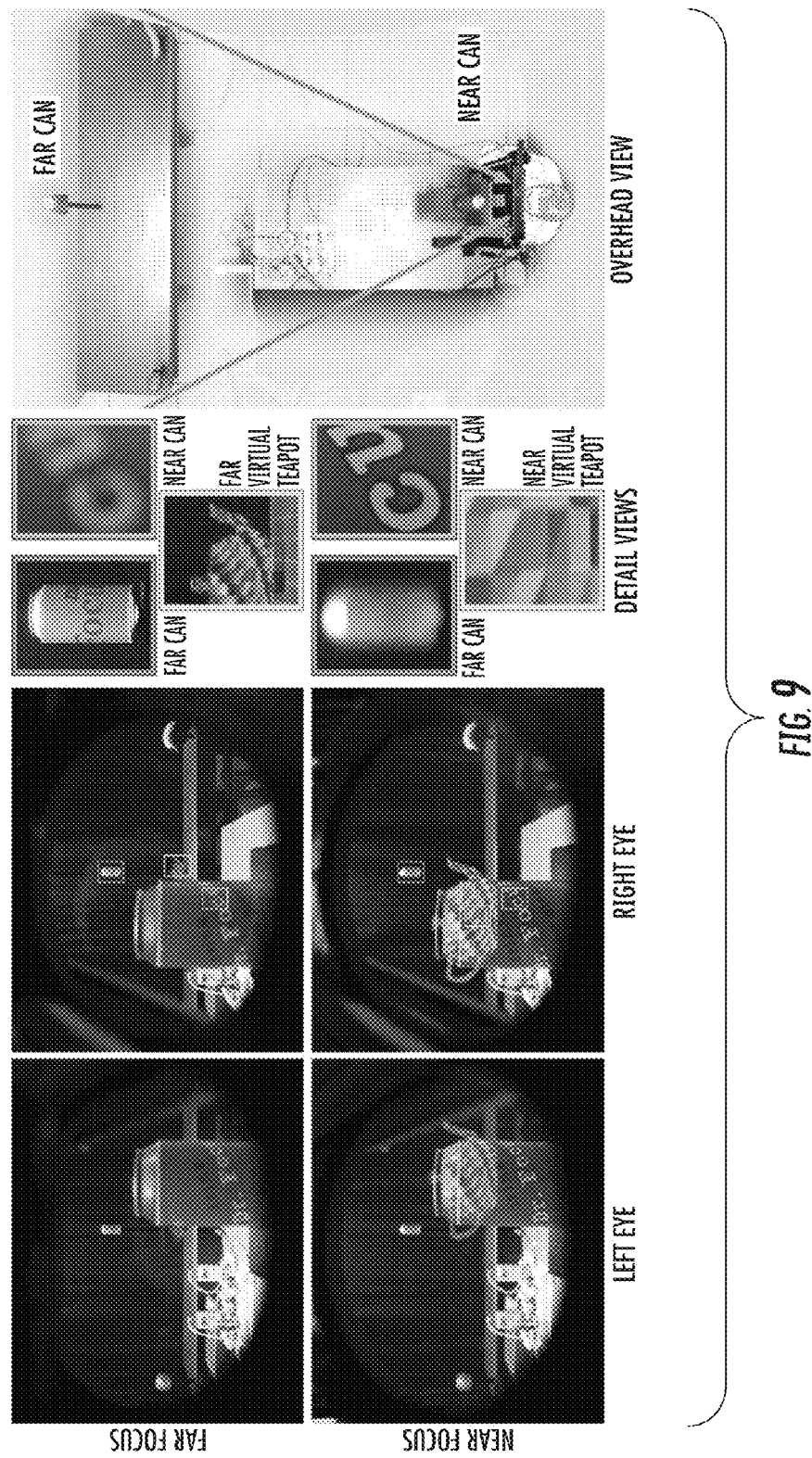
FIG. 9 illustrates images taken through the deformable membrane mirror used in the experiments described herein and an image of the field of view of the deformable membrane mirror used in the experiments described herein.

Given the components and the evaluated sample designs, we chose the following design parameters: $d_{eye\ relief}$=65 mm, $\beta$=40°, $\alpha$=10°, $d_{aperture}$=65.5×80.7 mm (H_V), and $d_{display}$=45 mm. Our fully assembled prototype is shown in FIG. 6. The FOV provided by our prototype matches our estimations computed using ray-tracing model. The FOV of our prototype is demonstrated as shown in FIG. 9. More particularly, FIG. 9 illustrates the field of view captured through the left and right deformable membrane mirrors with a virtual teapot superimposed on real world objects at different depths. In the top row, leftmost two columns of FIG. 9, the virtual teapot is in focus at the depth of a far object which in the illustrated example is a can sitting on a post located far from the display. In the bottom row, leftmost two columns in FIG. 9, the virtual teapot is shown to be in focus at the depth of the soda can that is near the user's eyes. The center columns in FIG. 9 show details from the right eye views showing the focus of the near and far soda cans and the virtual teapot. The rightmost image in FIG. 9 illustrates the field of view of the near eye display, which in the illustrated example is about 60 degrees. The monocular FOV and binocular FOV of our prototype are measured as 60° H and 90° H×45° V, respectively. We used an additional single axis lens in front of the central regions of our display to minimize astigmatism caused by elliptical aperture choice.

Using an early prototype of the housing, we conducted a deformation test for our deformable membrane mirror as shown in FIG. 10. During our deformation tests, we iterated to stretch the membrane back and forth to deformations that are 10 times larger than the deformations that we have during operation. The number in the upper left corner of each image in FIG. 10 represents a counter that tracks the number of iterations. Large ripples at the edge of the deformable membrane are believed to be caused by a weak attachment to the housing wearing out after 26700 iterations, which we solved in later iterations of the housing with a more secure attachment. Hazing in the images is believed to be caused by change in surface structure after many iterations. Our deformation test is conducted over a 30 hour time frame As our membrane underwent strains far greater than during normal operation without failing, we can conclude that our deformable membrane mirror and pneumatics control mechanism are suitable for long term usage.

4.3 Software

We developed an in-house software to control our prototype, to conduct subjective experiments, and to render images accordingly. Our software is written in Python programming language taking advantage of GLFW (see http://www.glfw.org) for user interface rendering, OpenCV (see http://opencv.org) for image processing tasks, and Pupil-labs library for gaze tracking tasks. Our software runs on an Intel Xeon CPU W5590 @ 3.33 GHz PC with two Nvidia Quadro NVS 420 graphics processing units (GPUs) and Linux operating system.

Our control methodology for the deformations of the deformable membrane mirror is based on reflection shape detection from infrared (IR) Light Emitting Diode (LED) 202 (see FIG. 7) placed above each deformable membrane mirror. IR camera 200 running at 30 FPS for each deformable membrane mirror 106 is also placed above the deformable membrane mirror as shown in bottom view of FIG. 6. Whenever the system is dictated to change the effective focal power, PC 212 electronically controls vacuum regulator 206 through uCs, and reflection detections from IR cameras 200 acts as a feedback mechanism to form a closed loop control mechanism.

For different depth levels, image distortions caused by our deformable membrane mirror are captured by a PointGrey Flea FLEA-HICOL camera (see https://www.ptgrey.com) with a Fujinon F1: 1.2-2.8-8 mm aperture lens. Note that the mentioned camera is for identification of image distortions, and may not be a permanent part of our system. We characterized image distortions by using the work of Yamazaki et al. [43] and our captures. We applied our findings on the image distortions to our software to present images consistently with the changing focus.

5 Experiments

The goal of our experiment was to verify whether our accommodation support works well, and if users can benefit from it while performing visual acuity task in a monocular viewing scenario. Our hypothesis was that a correct accommodation will allow users to resolve higher spatial details.

Figure 11:
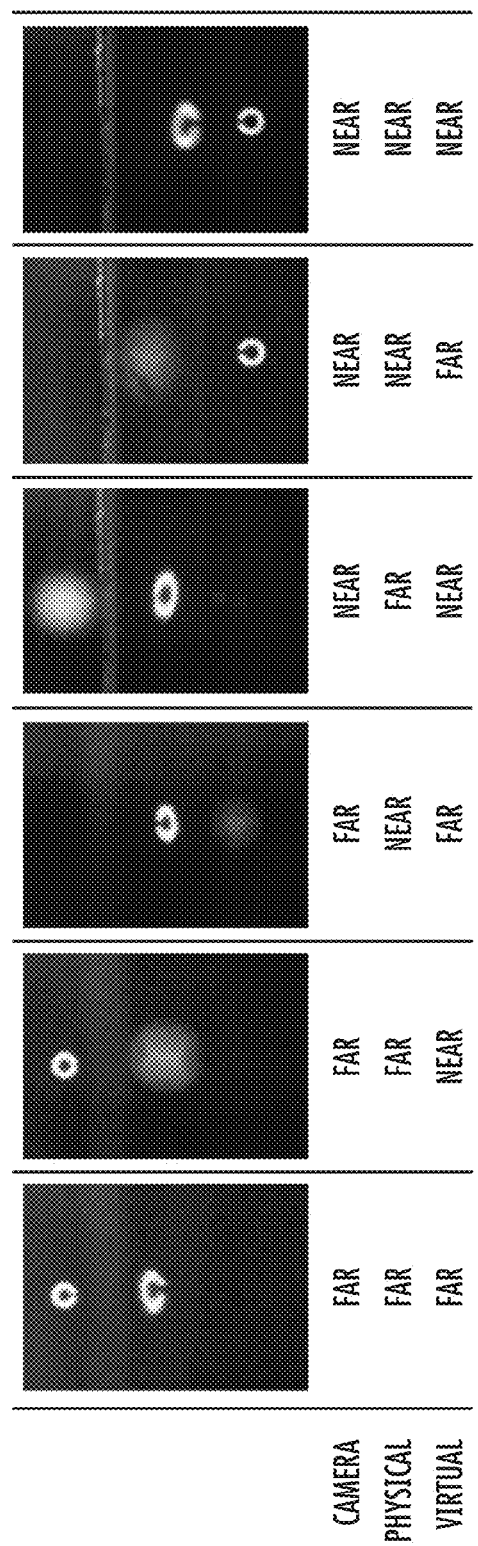
FIG. 11 is a series of photographs showing example stimuli seen by a participant in the experiments described herein.

Stimuli—Each stimulus consisted of a pair of white Landolt C shapes shown on a black background (FIG. 11). More particularly, FIG. 11 is a series of photographs showing example stimulus as seen by a participant during the experiment. Labels below each photograph indicate the focal state of the camera, the physical location of the display, and the depth of the augmented reality image. The location of the gaps was either on the top or on the bottom side corresponding to the up and the down orientation of the shape. The shapes were separated by 2 visual degrees, and each of them spanned 30 arcmin which impose the gap size of 6 arcmin, where the normal 20/20 eye can resolve 1 arcmin. Since through our NED calibration its focus state has been precisely setup for each trial, we opted for the larger gap size so that the user response is immediate and effortless, as well as it is not affected by lower display contrast, limited spatial resolution, and possibly imperfect luminance adaptation with respect to the requirements of standard visual acuity test. One shape was presented on one of two physical screens 208 and 210 (see FIG. 7) located at 0.25 m (Adafruit Qualia, 9:7", 2048×1536, 23.5 cpd, 60 Hz) and 5.0m (Sharp Aquos Quattron LC-70LE732U, 70", 1920×1080, 54.3 cpd, 60 Hz) from the viewer. The other Landolt shape was presented on our NED with a focal distance either matching the distance to the physical screen or a modified one to simulate a lack of a correct accommodation cue. The range of considered focal distance offsets was 0.2 to 5 diopters. For screen 208 located at 0.25 m, we moved the virtual object further from the observer, while for screen 210 located at 5.0 m, we moved the augmented reality image closer to the observer.

Participants—Twelve subjects (2 F, 10 M, 20 to 34 years of age) that had normal or corrected-to-normal vision, took part in the experiment. To keep participants inside the eyebox of our NED, all participants used a chin and forehead rest.

Procedure—At each trial, a participant was asked to monocularly fixate at a one of the physical screens. To this end, a simple math equation was displayed on the screen using a font of height 15 arcmin, while nothing was displayed on our NED. The user was asked to push one button, if the equation was true and another if it was false. This math task was introduced to control user fixation and give him enough time to correctly accommodate to the distance at which the physical screen was located. Immediately after responding, the stimulus appeared on the reference and the NED at a location central to the equation. The presentation time of the stimulus was set to 300 ms. The time was chosen such that it was just-enough to perform the visual acuity task, and it was determined during a pilot experiment. Note that the time is also shorter than the latency before the actual change in the lens shape is triggered, which we discuss in more detail in Section 6. Next, the participant was presented with a blank screen and asked to press a button selecting whether the two patterns were of equal or different orientation. Afterwards, the study continued with a next trial. In total, two physical displays and six focus distances for the NED were used in random order which after 20 repetitions gave the total of 240 trials per participant. Each participant took on average 30 minutes to complete the task.

Figure 12:
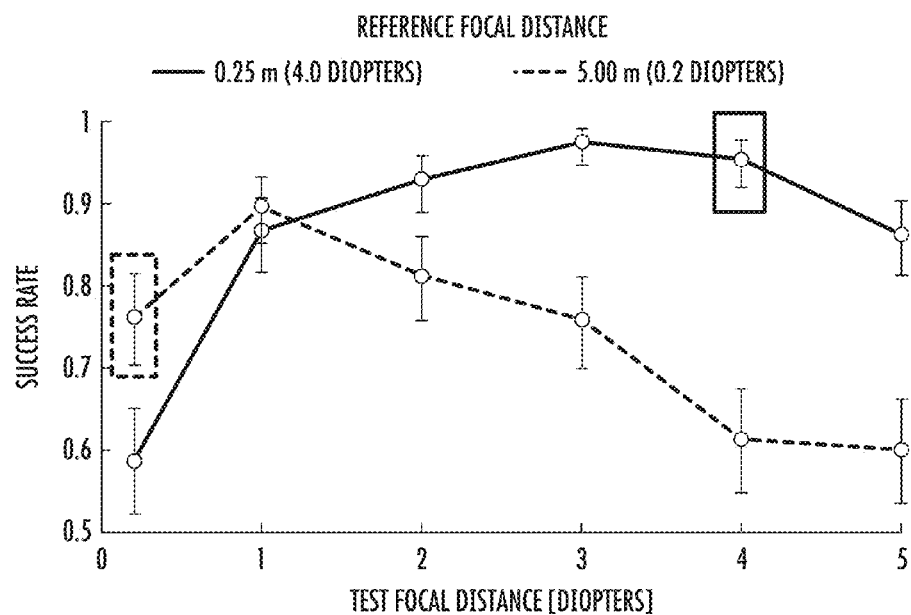
FIG. 12 is a graph illustrating mean task success rates as a function of test focal distances of the near eye display described herein.

Results—The graph in FIG. 12 shows relation of the NED focal depth and the proportion of correct answers for each of the reference displays. We performed a $X^2$-test to analyze differences between different conditions and found a significance influence of the test focal distance on the proportion correct for both 0.2 diopters ($X^2$=82.7, df=5, p<0.001) and 4.0 diopters ($X^2$=204.7, df=5, p<0.001) references. A post-hoc analysis with Boneferoni correction and significance level equal to 0.05 revealed that the differences between test pairs were significant for all but the following: 0.2/2.0, 0.2/3.0, 2.0/3.0, 4.0/5.0 for 0.2 diopters reference and 1.0/2.0, 1.0/5.0, 2.0/4.0, 3.0/4.0 for 4.0 diopters reference. More particularly, FIG. 12 illustrates mean task success rates as a function of test focal distance of the NED. Two points marked by rectangles are points where the reference and the test differences matched. For such conditions, the performance is expected to be the best. The arrow bars denote Clopper-Pearson binomial confidence intervals. As the test focal depth approached the reference depth, i.e., both stimuli were presented at the same focal distance, the participants were able to correctly perform the task more often maxing out at 97.5% and 89.6% for stimuli at 0.25 m (4 diopters) and 5.0 m (0:2 diopters), respectively. The best performance should be located at the points corresponding to the cases where the test and the references focal distances match (see rectangles in FIG. 12). Given the confidence intervals, this can be observed well for the closer physical display. For further screen, the drop of the performance for the isofocal condition can be explained by a degradation of the image quality due to a strong membrane distortion compensation required for such an extreme focus depth. This made the comparison of relatively small shapes difficult. Except this particular case, the trend in our measured data follows the expectation, i.e., the participant performance drops with increasing optical focus difference between both displays. For the reference display at 0.25 m distance (4 diopters, blue) and our NED set up to focus at 1.00 m (1 diopter) participants had to compare two shapes at focal distances differing by 3.0 diopters and had a mean performance of 86.7%. As our analysis shows, this is a significant drop (p<0.05 in a binomial test) from the optimal performance when the focus for NED matches the physical screen. Similar observations can be made for the reference display at distance of 5.00m (0:2 diopters, red) where the performance significantly dropped to 75.8% for the NED focused at 0.33 m (3 diopters) when compared to the case of focusing it at 1.0 m (1 diopter). Note that similar situations are encountered while using current AR displays with fixed focus distance. From these results, we conclude that the varifocal properties of our device improve user performance in tasks that require simultaneous observation of virtual and real world.

6 Limitations

The following are limitations of the prototype described herein but not limitations of the invention.

Pneumatics: The response time of 300 ms for switching from one extreme depth level to another can shorten through revisiting our pneumatics hardware design. Through our early experimentation, we found out that including a solenoid controlled bleed hole leads 100 ms response time. We believe that the response time can be decreased further with a design that has two vacuum compartments rather than one. Pneumatics of our prototype creates low volume audible noise as it accommodates to different image planes, a two compartments based design can also help us to avoid noise through vacuum. Our current peripheral devices that regulate our pneumatics can also be smaller in volume by using custom regulators. We are willing to overcome the mentioned design challenges in our next iterations by redesigning our pneumatics structure accordingly.

Form-factor: Our current optical design can be less bulky in size. According to our ray tracing model, tilting deformable membrane mirror towards peripheral can shrink the size of required aperture size towards peripheral. Working with circular apertures can also help us to avoid usage of lenses to correct astigmatism introduced by elliptical aperture shape used in our prototype. Through such modifications aperture size can be smaller in volume, leading to more practical implementations. Yet another challenge to be addressed is shrinking the optical path in between a display and a deformable membrane mirror, $d_{display}$. Through our analysis, with an increasing $d_{display}$, we observe that display size grows, and the supported resolution increases. We are planning to address this challenge in the near future by revisiting the display side of our design with a per eye display module with additional static custom optics. We will be iterating our current prototype to a more optimal point through off-the-shelf offerings, so that a wearable version can also be realized for further experimentation towards AR application specific research.

Latency: The performance of our display is affected by the system latency. Its first source is the eye-tracking system. However, it has been demonstrated that good quality eye-tracking systems [9], can achieve latency as low as 50 ms.

The second source of latency is the membrane. The change of its shape for the most extreme scenario can take up to 300 ms. Again, these limitations may remain unnoticed due the characteristic of the eye accommodation process which also exhibits large delays. First, a latency (reaction time) of 300-500 ms has typically been observed before the actual change in the lens shape is initiated [4,6,10,36]. While Phillips et al. [36] have observed latencies as short as 200 ms, the probability of their occurrence is very low. They hypothesize that such short latencies can be explained by coincidence or confusion of some subjects who have not carefully followed the experiment protocol. The duration of the actual lens accommodation process of 500-800 ms has been reported [4,6,10,36], which means that the complete accommodation cycle, including the latency, typically requires around 1 second [6]. The velocity of accommodation is a good measure of the lens accommodation dynamics. Bharadwaj et al. [4] observed a smooth increase in velocity to its peak value and then its slightly slower reduction to a steady state. The peak velocity increased with the accommodation magnitude and the highest value of around 10 diopters/second has been reported. Kasthurirangan et al. [17] observed a similar average peak velocity for the lens accommodation, but a high variance can be observed in their data.

Also, for a disaccommodation, the peak velocities over 20 diopters/second have been measured for the large accommodation magnitudes of 4-5 diopters, which are still within the range of focal changes in our NED. The operational velocity of our membrane amounts to 16.6 diopters/second, which might be below the peak velocity for disaccommodation in extreme depth changes. Since our membrane deformation is initiated during the period of eye accommodation latency and its maximum duration is less than 300 ms, we expect that the whole process is completed well before such extreme lens accommodation velocities are reached. The total latency of our system remains below the delays of the eye accommodation process, and may be sufficiently low for AR applications. This is supported by results of our subjective experiments. We leave more in-depth experiments regarding latency requirements for future work. Note that in contrast to the discussed findings from the perception literature here, the dynamic accommodation state in our setup is affected by simultaneously changing shapes of the NED's membrane and eye's lens, which has not been investigated so far.

Figure 13:
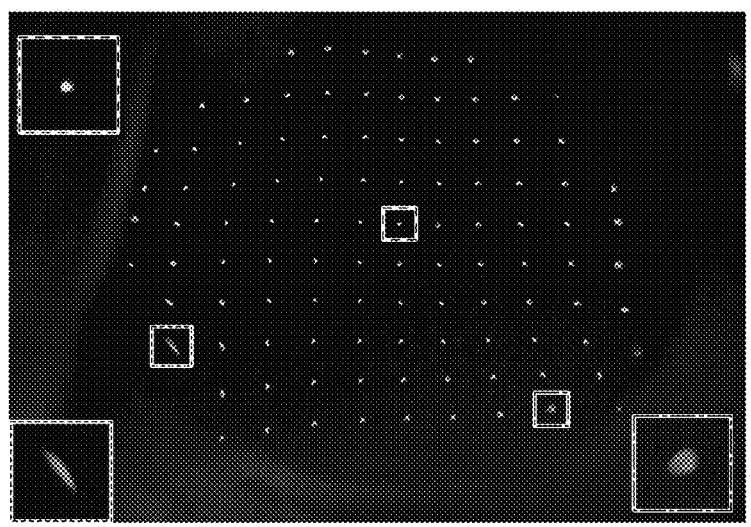
FIG. 13 is a view approximating the point spread function across the deformable membrane mirror. Squares of 3×3 pixels are illuminated in a grid pattern to show the graceful degradation of focus across the membrane. Severe defocus in lower left region is caused by inadequate tension on membrane when closing and securing the housing.

Consistency of focal properties: Our display does not guarantee the same focus properties across the entire field of view as this would require a more challenging membrane design, i.e., optimizing its mechanical properties. Instead, our system provides a correct focal cue in the central vision and its graceful degradation towards peripheral vision as seen in FIG. 13. This is aligned with the limitation of the human visual system regarding the accommodation. The perceptual sensitivity to lack of focus is characterized by the eye depth-of-focus (DoF), which denotes the maximum range of retinal defocus that does not cause perceivable blur. The DoF depends on many factors such as the pupil size, the quality of eye optics, as well as properties of observed content in terms of color and contrast, luminance levels, and spatial frequency content [35]. However, typically the DoF at the fovea is considered, and values around 0:3 diopters have been reported [4] for suprathreshold contrasts and photopic lighting conditions. Note that the accommodative system responds to much smaller focal changes of 0.12 diopters, but those are not perceivable [19]. With increasing retinal eccentricity the DoF increases significantly [31, 34]. Even in the relatively near retinal periphery of 5°, it amounts to 2.5 diopters. DoF saturates at the level of 6-7 diopters for eccentricities larger than 30°. The increase of DoF with eccentricity reduces requirements imposed on the membrane design in our display, as relatively high defocus blur can be tolerated outside the central foveal region without causing any perceivable degradation of the image quality. Using the eye tracking system, we are able to provide a precise focus in the foveal region, while the precision of membrane shaping outside such region can be relaxed. This greatly simplifies maintaining the high visual quality over a wide FOV.

Depth of field: Our display is capable of displaying only a single depth at a time, which leads to incorrect views for virtual content at different depths. A simple solution to this would be to apply a defocus kernel approximating the eye's point spread function to the augmented reality image according to the depth of the virtual objects. Due to the potential of rendered blur not being equivalent to optical blur, we have not implemented this solution. Future work must evaluate the effectiveness of using rendered blur in place of optical blur.

Occlusion support: The work of Kiyokawa et at. [20] describes an occlusion cable NED, and introduces an application space that requires occlusion support. Our proposal does not attempt to support occlusion. We leave this challenge as a future work.

Monocular vs. binocular experiment: We present a binocular display, but verify it only by a monocular experiment. Our monocular experiment has demonstrated that combined real-virtual depth-varying task performance can be improved with focal accommodation. However, binocular experiments would allow us to show a relationship between vergence-accommodation conflict and task performance. We leave binocular experiments for a future work, and are excited by the possible perceptual studies which are now open with this new hardware prototype. In particular, we would like to verify that visual fatigue due to vergence accommodation conflict can be mitigated by our display. Such experiments can potentially also reveal more interesting facts about the vergence-accommodation relationship.

7 Conclusion

In order to provide a high-quality augmented reality experience, it is crucial to design headsets that are capable of reproducing all visual cues across whole visual field. In this respect, the most challenging are reproduction of accommodation cue as well as providing wide field of view. To address these problems, we propose a novel design of a see through near eye display for augmented reality applications. The key to our solution are two membranes with half-mirror properties. Thanks to their deformation properties, their focal power can be adjusted using an airtight chamber to provide accommodation cues matching the observer's fixation distance determined by an eye tracker. This addresses the problem of visual discomfort which is usually caused by a mismatch between vergence and accommodation. It also improves user task performance as demonstrated in our experiments. Another unique advantage of our membranes is the fact that they enable a significantly larger field of view when compared to other varifocal designs. Despite few limitations of our system, we believe that providing correct focus cues as well as wide field of view are crucial features of head-mounted displays that try to provide seamless integration of the virtual and the real world. Our screen not only provides basis for new, improved designs, but it can be directly used in perceptual experiments that aim at determining requirements for future systems. We, therefore, argue that our work will significantly facilitate the development of augmented reality technology and contribute to our understanding of how it influences user experience.

The disclosure of each of the following references is hereby incorporated herein by reference in its entirety.

REFERENCES

[1] K. Akşit, J. Kautz, and D. Luebke. Slim near eye display using pin-hole aperture arrays. Applied optics, 54(11): 3422-3427, 2015.

[2] K. W. Arthur. Effects of field of view on performance with head-mounted displays. PhD thesis, University of North Carolina at Chapel Hill, 2000.

[3] H. Benko, E. Ofek, F. Zheng, and A. D. Wilson. Fovear: Combining an optically see through near eye display with projector-based spatial augmented reality. In Proceedings of the 28th Annual ACM Symposium on User Interface Software & Technology, pages 129-135. ACM, 2015.

[4] S. R. Bharadwaj and C. M. Schor. Acceleration characteristics of human ocular accommodation. Vision Research, 45(1):17-28, 2005.

[5] F. Campbell. The depth of field of the human eye. Optica Acta: International Journal of Optics, 4(4):157-164, 1957.

[6] F. Campbell and G. Westheimer. Dynamics of accommodation responses of the human eye. J. Physiol., 151(2):285-295, 1960.

[7] J. Carmigniani, B. Furht, M. Anisetti, P. Ceravolo, E. Damiani, and M. Ivkovic. Augmented reality technologies, systems and applications. Multimedia Tools and Applications, 51(1):341-377, 2011.

[8] N. A. Dodgson. Variation and extrema of human interpupillary distance. In Electronic imaging 2004, pages 36-46. International Society for Optics and Photonics, 2004.

[9] B. Guenter, M. Finch, S. Drucker, D. Tan, and J. Snyder. Foveated 3d graphics. ACM Transactions on Graphics (TOG), 31(6):164, 2012.

[10] G. Heron, W. Charman, and C. Schor. Dynamics of the accommodation response to abrupt changes in target vergence as a function of age. Vision Research, 41(4):507-519, 2001.

[11] D. M. Hoffman, A. R. Girshick, K. Akeley, and M. S. Banks. Vergence-accommodation conflicts hinder visual performance and cause visual fatigue. Journal of vision, 8(3):33-33, 2008.

[12] X. Hu and H. Hua. High-resolution optical see through multi-focal-plane head-mounted display using freeform optics. Optics express, 22(11):13896-13903, 2014.

[13] H. Hua and B. Javidi. A 3d integral imaging optical see through head-mounted display. Optics express, 22(11):13484-13491, 2014.

[14] F.-C. Huang, D. Luebke, and G. Wetzstein. The light field stereoscope. ACM SIGGRAPH Emerging Technologies, page 24, 2015.

[15] P. V. Johnson, J. A. Parnell, J. Kim, M. S. Banks, G. D. Love, et al. Assessing visual discomfort using dynamic lens and monovision displays. In 3D Image Acquisition and Display: Technology, Perception and Applications, pages TT4A-1. Optical Society of America, 2016.

[16] P. V. Johnson, J. A. Parnell, J. Kim, C. D. Saunter, G. D. Love, and M. S. Banks. Dynamic lens and monovision 3d displays to improve viewer comfort. arXiv preprint arXiv:1512.09163, 2015.

[17] S. Kasthurirangan, A. S. Vilupuru, and A. Glasser. Amplitude dependent accommodative dynamics in humans. Vision Research, 43(27):2945-2956, 2003.

[18] H.-J. Kim, S.-K. Lee, M.-L. Piao, N. Kim, and J.-H. Park. Three-dimensional holographic head mounted display using holographic optical element. In Consumer Electronics (ICCE), 2015 IEEE International Conference on, pages 132-133. IEEE, 2015.

[19] K. Kiyokawa. A wide field-of-view head mounted projective display using hyperbolic half-silvered mirrors. In Proceedings of the 2007 6th IEEE and ACM International Symposium on Mixed and Augmented Reality, pages 1-4. IEEE Computer Society, 2007.

[20] K. Kiyokawa, M. Billinghurst, B. Campbell, and E. Woods. An occlusion-capable optical see-through head mount display for supporting co-located collaboration. In Proceedings of the 2nd IEEE/ACM International Symposium on Mixed and Augmented Reality, page 133. IEEE Computer Society, 2003.

[21] J. C. Kotulak and C. M. Schor. The accommodative response to subthreshold blur and to perceptual fading during the troxler phenomenon. Perception, 15(1):7-15, 1986.

[22] G. Kramida et al. Resolving the vergence-accommodation conflict in head-mounted displays. pages TT4A-1, 2016.

[23] E. Kruijff, J. E. Swan II, and S. Feiner. Perceptual issues in augmented reality revisited. In ISMAR, volume 9, pages 3-12, 2010.

[24] D. Lanman and D. Luebke. Near eye light field displays. ACM Transactions on Graphics (TOG), 32(6):220, 2013.

[25] S. Lee, X. Hu, and H. Hua. Effects of optical combiner and ipd change for convergence on near-field depth perception in an optical see-through hmd. IEEE transactions on visualization and computer graphics, 22(5):1540-1554, 2016.

[26] G. Lippmann. Epreuves reversibles. photographies integrals. Comptes-Rendus Academie des Sciences, 146:446-451, 1908.

[27] S. Liu, D. Cheng, and H. Hua. An optical see through head mounted display with addressable focal planes. In Mixed and Augmented Reality, 2008. ISMAR 2008. 7th IEEE/ACM International Symposium on, pages 33-42. IEEE, 2008.

[28] A. Maimone, D. Lanman, K. Rathinavel, K. Keller, D. Luebke, and H. Fuchs. Pinlight displays: wide field of view augmented reality eyeglasses using defocused point light sources. In ACM SIGGRAPH 2014 Emerging Technologies Booth 203. ACM, 2014.

[29] J. D. Mansell, S. Sinha, and R. L. Byer. Deformable mirror development at Stanford university. In International Symposium on Optical Science and Technology, pages 1-12. International Society for Optics and Photonics, 2002.

[30] S. McKay, G. M. Mair, S. Mason, and K. Revie. Membrane-mirrorbased autostereoscopic display for teleoperation and teleprescence applications. In Electronic Imaging, pages 198-207. International Society for Optics and Photonics, 2000.

[31] S. McKay, S. Mason, L. S. Mair, P. Waddell, and S. M. Fraser. Membrane-mirror-based display for viewing 2d and 3d images. In Electronic Imaging '99, pages 144-155. International Society for Optics and Photonics, 1999.

[32] H. Nagahara, Y. Yagi, and M. Yachida. Super wide field of view head mounted display using catadioptrical optics. Presence, 15(5):588-598, 2006.

[33] G. W. R. Konrad, E. A Cooper. Novel optical configurations for virtual reality: Evaluating user preference and performance with focus-tunable and monovision near eye displays. Proceedings of the ACM Conference on Human Factors in Computing Systems (CHI'16), 2016.

[34] E. G. Rawson. Vibrating varifocal mirrors for 3-d imaging. IEEE Spectrum, 6(9):37-43, 1969.

[35] L. Ronchi and G. Molesini. Depth of focus in peripheral vision. Ophthalmic Res, 7(3):152-157, 1975.

[36] S. Phillips, D. Shirachi, and L. Stark. Analysis of accommodative response times using histogram information. American Journal of Optometry & Archives of American Academy of Optometry, 49(5):389-400, 1972.

[37] R. Seghir and S. Arscott. Extended pdms stiffness range for flexible systems. Sensors and Actuators A: Physical, 230:33-39, 2015.

[38] A. Sisodia, A. Riser, and J. R. Rogers. Design of an advanced helmet mounted display (ahmd). In Defense and Security, pages 304-315. International Society for Optics and Photonics, 2005.
[39] G. Spencer and M. Murty. General ray-tracing procedure. JOSA, 52(6):672-676, 1962.
[40] B. Wang and K. J. Ciuffreda. Depth-of-focus of the human eye in the near retinal periphery. Vision Research, 44(11):1115-1125, 2004.
[41] B. Wang and K. J. Ciuffreda. Depth-of-focus of the human eye: Theory and clinical implications. Survey of Ophthalmology, 51(1):75-85, 2006.
[42] A. Werber and H. Zappe. Tunable pneumatic microoptics. Journal of Microelectromechanical Systems, 17(5): 1218-1227, 2008.
437] S. Yamazaki, M. Mochimaru, and T. Kanade. Simultaneous self-calibration of a projector and a camera using structured light. In Proc.
Projector Camera Systems, pages 67-74, 2011.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A head mountable augmented reality see through near eye display system comprising:
   a see through augmented reality image focal distance modulator for changing a distance at which augmented reality images are perceived to be in focus and including at least one light transmissive surface through which real world objects are viewable, wherein the at least one light transparent surface includes a rigid transparent surface and a deformable membrane mirror attached to the rigid transparent surface;
   a display for generating an augmented reality image and projecting the augmented reality image onto the deformable membrane mirror of the see through augmented reality image focal distance modulator and the real world objects are viewable through the rigid transparent surface and the deformable membrane mirror when the augmented reality images are projected by the display onto the deformable membrane mirror, which is deformable to change a distance at which the augmented reality images are perceived to be in focus; and
   an augmented reality image focal distance controller for controlling the see through augmented reality image focal distance modulator to cause the augmented reality images to be perceivable in focus at a distance corresponding to a vergence distance and for changing the distance at which the augmented reality images are perceived to be in focus in correspondence with changes in the vergence distance, wherein the see through augmented reality focal distance modulator comprises a single optical element for changing the distance at which the augmented reality images are perceived to be in focus and for optically combining the augmented reality images with a view of the real world objects.

2. The system of claim 1 comprising a vacuum chamber, wherein the deformable membrane mirror is deformable by changes in pressure in the vacuum chamber.

3. The system of claim 1 comprising first and second vacuum chambers located on opposite sides of the deformable membrane and wherein the deformable membrane mirror is deformable via a pressure differential between the first and second vacuum chambers.

4. The system of claim 1 wherein the deformable membrane mirror is mechanically deformable.

5. The system of claim 1 wherein the deformable membrane mirror includes magnetic particles embedded within the deformable membrane and wherein the deformable membrane mirror is deformable through application of magnetic force to the magnetic particles.

6. The system of claim 1 wherein the augmented reality image focal distance modulator is configured to continually deform the deformable membrane mirror through a range of deformations corresponding to a range of augmented reality image focal distances and to control the display to flash the augmented reality images on the deformable membrane mirror when the deformable membrane mirror is deformed at a desired augmented reality image focal depth.

7. The system of claim 1 wherein the see through augmented reality image focal distance modulator provides a horizontal monocular field of view of 60 degrees.

8. The system of claim 1 comprising a frame for positioning the see through augmented reality image focal distance modulator physically in front of a user's eye.

9. The system of claim 8 wherein the see through augmented reality image focal distance modulator is tilted with respect to the display to reflect the augmented reality image into the user's eye.

10. A method for displaying augmented reality images to a user via a head mountable augmented reality see through near eye display system, the method comprising:
    using a display, generating an augmented reality image and projecting the augmented reality image onto a see through augmented reality image focal distance modulator through which real world objects are viewable, wherein the see through augmented reality focus distance modulator comprises a rigid transparent surface and a deformable membrane mirror attached to the rigid transparent surface and the real world objects are viewable through the rigid transparent surface and the deformable membrane mirror when the augmented reality images are projected by the display onto the deformable membrane mirror, which is deformable to change a distance at which the augmented reality images are perceived to be in focus;
    a controller for controlling the see through augmented reality image focal distance modulator to cause the augmented reality images to be perceivable in focus at a vergence distance; and
    changing the distance at which the augmented reality images are perceived to be in focus in correspondence with changes in the vergence distance, wherein the see through augmented reality focal distance modulator comprises a single optical element for changing the distance at which the augmented reality images are perceived to be in focus and for optically combining the augmented reality images with a view of the real world objects.

11. The method of claim 10 comprising a vacuum chamber, wherein the deformable membrane mirror is deformable by changes in pressure in the vacuum chamber.

12. The method of claim 10 comprising first and second vacuum chambers located on opposite sides of the deformable membrane mirror and wherein the deformable membrane mirror is deformable via a pressure differential between the first and second vacuum chambers.

13. The method of claim 10 wherein the deformable membrane mirror is mechanically deformable.

14. The method of claim 10 wherein the deformable membrane mirror includes magnetic particles embedded within the deformable membrane and wherein the deformable membrane mirror is deformable through application of magnetic force to the magnetic particles.

15. The method of claim 10 wherein the augmented reality image focal distance modulator is configured to continually deform the deformable membrane mirror through a range of deformations corresponding to a range of augmented reality image focal distances and to control the display to flash the augmented reality images on the deformable membrane mirror when the deformable membrane mirror is deformed at a desired augmented reality image focal depth.

16. A non-transitory computer readable medium having stored thereon executable instructions that when executed by the processor of a computer control the computer to perform steps comprising:

in a head mountable augmented reality see through near eye display system:

using a display, generating an augmented reality image and projecting the augmented reality image onto a see through augmented reality image focal distance modulator through which real world objects are viewable, wherein the see through augmented reality focus distance modulator comprises a rigid transparent surface and a deformable membrane mirror attached to the rigid transparent surface and the real world objects are viewable through the rigid transparent surface and the deformable membrane mirror when the augmented reality images are projected by the display onto the deformable membrane mirror, which is deformable to change a distance at which the augmented reality images are perceived to be in focus;

a controller for controlling the see through augmented reality image focal distance modulator to cause the augmented reality images to be perceivable in focus at a distance corresponding to a vergence distance; and changing the distance at which augmented reality images are perceived to be in focus in correspondence with changes in the vergence distance, wherein the see through augmented reality focal distance modulator comprises a single optical element for changing the distance at which the augmented reality images are perceived to be in focus and for optically combining the augmented reality images with a view of the real world objects.

* * * * *

UNITED STATES PATENT AND TRADEMARK OFFICE
CERTIFICATE OF CORRECTION

PATENT NO. : 9,983,412 B1
APPLICATION NO. : 15/423198
DATED : May 29, 2018
INVENTOR(S) : Fuchs et al.

Page 1 of 1

It is certified that error appears in the above-identified patent and that said Letters Patent is hereby corrected as shown below:

In the Specification

Column 1, Line 8 replace:
"This invention was made with government support under Grant No. 1645463 awarded by the National Science Foundation under the Early Concept Grants for Exploratory Research (EAGER) program. The government has certain rights in the invention."

With:
--This invention was made with government support under Grant Number IIS-1645463 awarded by the National Science Foundation. The government has certain rights in the invention.--

Signed and Sealed this
Eleventh Day of June, 2019

Andrei Iancu
*Director of the United States Patent and Trademark Office*